United States Patent
Fujiwara

[19]

[11] Patent Number: 6,089,560
[45] Date of Patent: *Jul. 18, 2000

[54] MEDIUM CONVEYING APPARATUS AND FRONT LOADING MECHANISM

[75] Inventor: Tatsuo Fujiwara, Kawasaki, Japan

[73] Assignee: Fujitsu Limited, Kanagawa, Japan

[ * ] Notice: Under 35 U.S.C. 154(b), the term of this patent shall be extended for 490 days.

[21] Appl. No.: 08/630,332

[22] Filed: Apr. 10, 1996

[30] Foreign Application Priority Data

Apr. 14, 1995 [JP] Japan ..................................... 7-089155

[51] Int. Cl.⁷ ..................................................... B65H 5/22
[52] U.S. Cl. ................... 271/4.1; 271/10.11; 271/10.13; 271/164; 271/207; 271/114
[58] Field of Search ................... 271/1.01, 4.1, 271/10.11, 10.13, 145, 162, 164, 207, 114

[56] References Cited

U.S. PATENT DOCUMENTS

| | | | |
|---|---|---|---|
| 4,009,957 | 3/1977 | Suzuki et al. | 271/4.1 |
| 4,508,444 | 4/1985 | May et al. | 271/4.1 |
| 4,722,518 | 2/1988 | Watanabe | 271/10.11 |
| 4,958,823 | 9/1990 | Iwaki et al. | 271/164 |
| 5,067,835 | 11/1991 | Yamamoto et al. | 271/145 |
| 5,139,252 | 8/1992 | Morita et al. | 271/164 |
| 5,149,078 | 9/1992 | Matsuda et al. | 271/145 |
| 5,157,448 | 10/1992 | Lang | 271/162 |
| 5,413,409 | 5/1995 | Arai | 271/162 |

FOREIGN PATENT DOCUMENTS

| | | |
|---|---|---|
| 0 621 719A1 | of 0000 | European Pat. Off. . |
| 0 370 484 A2 | 5/1990 | European Pat. Off. . |
| 0 459 529 A2 | 12/1991 | European Pat. Off. . |
| 4-300332 | 10/1992 | Japan . |
| 405092825 | 4/1993 | Japan ..................................... 271/145 |
| 6-121120 | 4/1994 | Japan . |
| 0 370 484 | 5/1997 | Japan . |
| 1 436 912 | 5/1976 | United Kingdom . |
| 2 154 557 | 9/1985 | United Kingdom . |
| 2130558 | 6/1994 | United Kingdom ................ 271/10.13 |
| WO94/09589 | 4/1994 | WIPO . |

OTHER PUBLICATIONS

Great Britain Search Report dated Nov. 11, 1996; Application No. GB 9607745.8.

Primary Examiner—H. Grant Skaggs
Attorney, Agent, or Firm—Armstrong, Westerman, Hattori, McLelland & Naughton

[57] ABSTRACT

To provide a conveying apparatus which prevents a document being damaged by accidental opening and closing operations of the drawer portion, and a document reading apparatus; there is provided a medium conveying apparatus which at least includes a drawer type hopper or stacker which receives therein a medium and which is loaded in the apparatus body, so that the medium is fed from the hopper into a feed passage and is discharged into a stacker, wherein; a sensor is provided in the feed passage to detect the presence or absence of the medium in the feed passage, so that when the presence of the medium in the feed passage is detected by the sensor, control is carried out so as not to open or close the drawer type hopper or stacker.

9 Claims, 23 Drawing Sheets

Fig.1
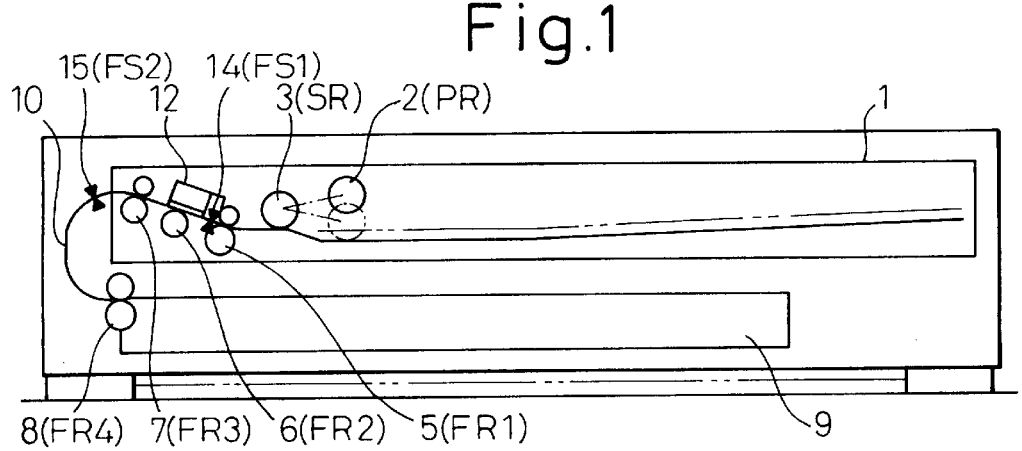
Fig.2
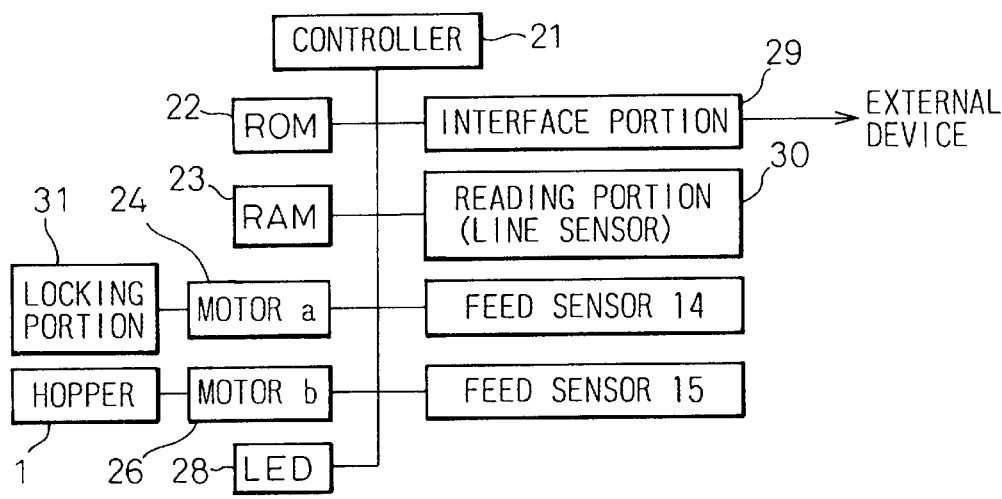
Fig.3
| STATE | FS 1 | FS 2 | ON FEED PASSAGE |
|---|---|---|---|
| (1) | DOCUMENT DETECTED | DOCUMENT DETECTED | DOCUMENT PRESENCE |
| (2) | DOCUMENT DETECTED | DOCUMENT UNDETECTED | DOCUMENT PRESENCE |
| (3) | DOCUMENT UNDETECTED | DOCUMENT DETECTED | DOCUMENT PRESENCE |
| (4) | DOCUMENT UNDETECTED | DOCUMENT UNDETECTED | DOCUMENT ABSENCE |

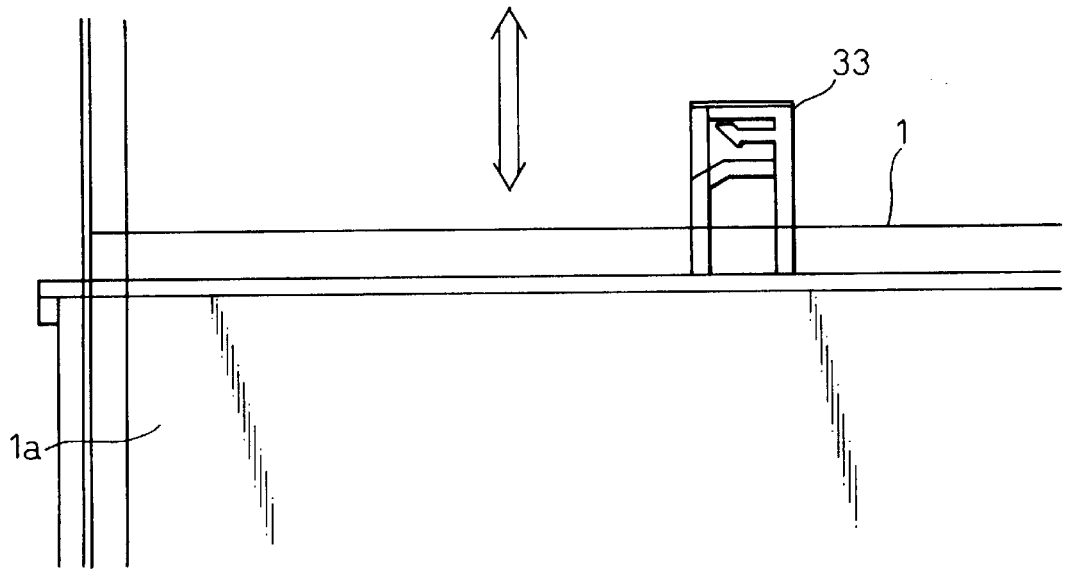
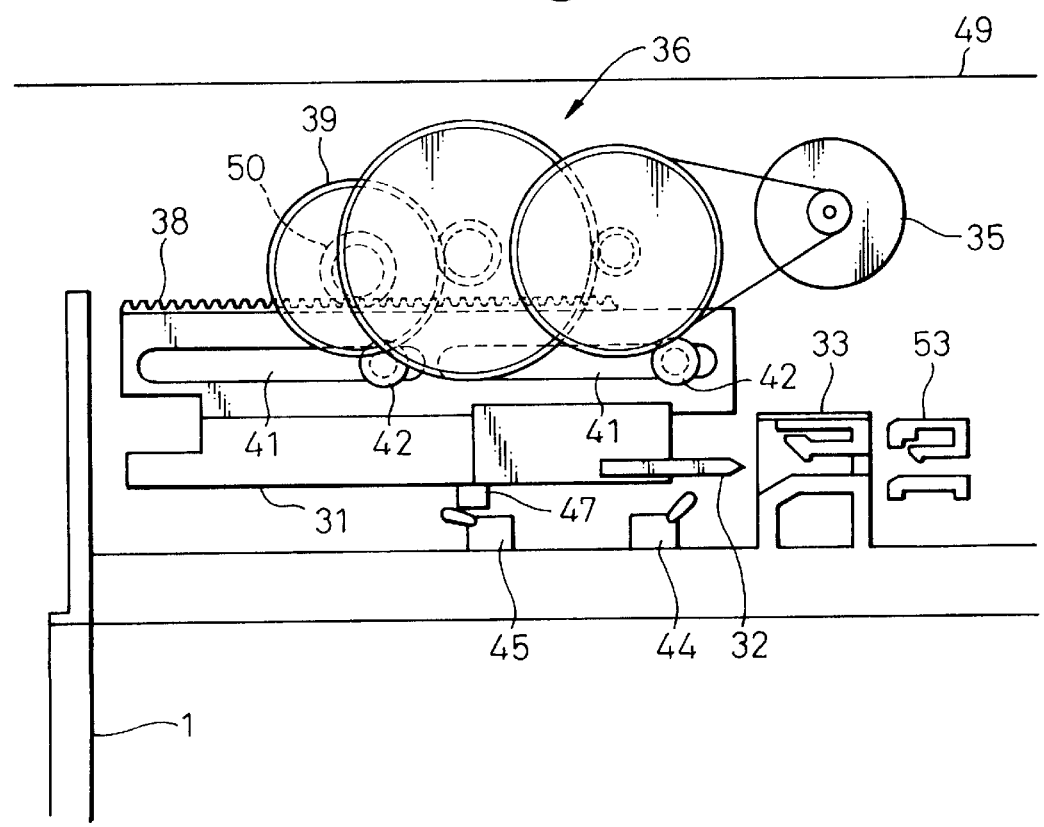

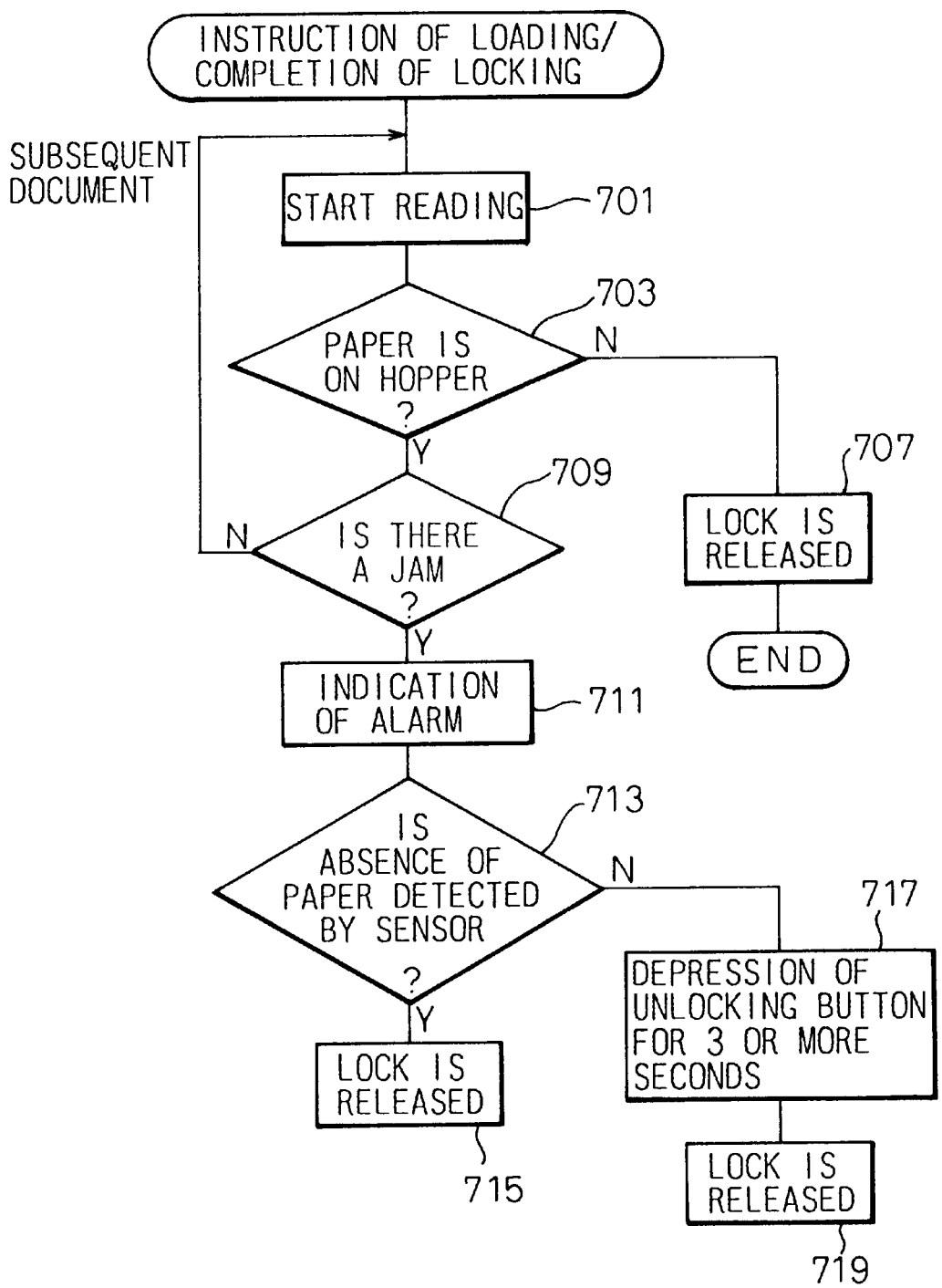

| STATE | FS1 | ON FEED PASSAGE |
|---|---|---|
| (1) | DOCUMENT DETECTED | DOCUMENT PRESENTCE |
| (2) | DOCUMENT DETECTED | DOCUMENT PRESENTCE |

MEDIUM CONVEYING APPARATUS AND FRONT LOADING MECHANISM

BACKGROUND OF THE INVENTION

1. Field of the Invention

The present invention relates to a medium conveying apparatus which can be applied to an image reader or printer, etc. In recent electronic document filing systems, image reading devices (referred to as scanners) have been widely used. It is desirable that such readers do not occupy a large space from the viewpoint of saving space. Note that the following discussion will be addressed to a scanner, but the invention can be equally applied to a printer or the like.

2. Description of the Related Art

In general, known scanners are grouped into two types, i.e., an ADF type (Automatic Document Feeder), and a flat bed type. The ADF is provided on the scanner. It is possible to set a plurality of documents to be read on the ADF at one time, and the documents can be automatically fed one by one. FIG. 29 shows a schematic view of an outer appearance of an ADF type scanner. In FIG. 29, 191 designates the hopper, 192 the reading portion, and 193 the stacker, respectively. 194 designates the conveyer passage. The documents stacked in the hopper 191 are successively fed to the reading portion 192 one by one and discharged therefrom onto the stacker 193. The scanner of the kind mentioned above exhibits a high reading efficiency since the documents are automatically fed.

FIG. 30 shows a flat bed type scanner. In the flat bed type scanner, there is a reading window (flat bed) 201 on the upper surface of the scanner. A reading portion 202 is provided in the scanner. In the scanner shown in FIG. 30, a document to be read is disposed on the reading window 201, and the reading portion 202 is moved in the directions indicated by arrows to scan and read the document. To read a plurality of documents, documents must be put on the reading window 201 one by one, and thus resulting in a lower reading efficiency. However, the flat bed type scanner is simpler in structure than the ADF type scanner, and accordingly is relatively inexpensive. This is the reason that the flat bed type scanners are often used by individuals who usually do not need to read a large number of documents using the scanner. However, the known scanners as mentioned above are not satisfactory in view of the use of space.

For instance, in case of the ADF type scanner, the stacker 193 extends out of the apparatus, thus leading to a large accommodation space. Moreover, the hopper 191 which receives documents disposed thereon partly projects upward. In addition, the hopper 191 is not strong enough to permit things to be put thereon. The fact that nothing can be put on the hopper also increases the amount of useless space.

In the case of the flat bed type scanner, the stacker or other elements do not project from the apparatus and accordingly the apparatus is relatively small. Nevertheless, since it is necessary for an operator to put the document on the reading window 201 formed on the upper surface of the scanner, the space above the apparatus cannot be effectively utilized, unlike the ADF type scanner.

These problems also occur in a printer or the like, in which sheets of paper to be printed are disposed on the hopper.

To solve the problems, the applicant of the present application has proposed an improved scanner in which an accommodation space can be effectively utilized (Japanese Patent Application No. 6-509826). FIGS. 31A and 31B show the proposed scanner.

The scanner illustrated includes a box type casing in and from which a hopper 211 having documents 215 to be read is inserted and withdrawn. Upon reading the document, the hopper is closed, so that the document is read by a reading unit provided in the apparatus. The document thus read is fed through a returning passage 213 and discharged into a stacker 214 which is provided for example in the lower portion of the apparatus. The reading unit is comprised of, for example, a close-contact sensor and is provided in a drawer type hopper in FIGS. 31A and 31B. The reading unit is not necessarily positioned in the hopper and can be instead provided in the apparatus body.

As can be seen from the foregoing, in the scanner illustrated in FIGS. 31A and 31B, there is no member necessary to read the document on the upper portion of the scanner, and accordingly, it is possible to put other devices such as a personal computer, on the scanner. Consequently, the substantial space for accommodating the scanner can be reduced.

In the scanner, the hopper is closed when the document is read and the hopper is opened for example when document is set in the hopper. However, if a paper jam occurs in the scanner, it is necessary to remove the jammed document from the apparatus. To this end, the apparatus is provided on the side wall thereof with an opening through which the jammed document can be removed by opening a cover at the opening.

A user may open the drawer type hopper to try to remove the jammed document. If the jammed document M is located in the hopper 211, as shown in FIG. 32A, or has been discharged from the hopper 211 as shown in FIG. 32B, there would be no serious problem even if the hopper 211 is opened.

However, as shown in FIG. 32C, if the hopper 211 is opened when the document M to be read is located partly in the hopper 211 and partly out of the hopper, the jammed document M which is held by rollers or the like within the apparatus can be creased or damaged.

The crease itself can be eliminated to some extent by flattening the document discharged from the apparatus, so that the document can be read. In the worst case, the document is destroyed, this resulting in the impossibility of re-reading the document.

Moreover, if the hopper is accidentally opened during the feeding of the document, not only can the document be damaged, but also, the feeding of the document can be interrupted. Accordingly, it is necessary to prevent the hopper from opening during the feeding of the document.

It is possible to provide a drawer type stacker in addition to the drawer type hopper shown in FIGS. 31A and 31B. In this alternative arrangement, the opening operation of the stacker could cause the document to be damaged.

SUMMARY OF THE INVENTION

The primary object of the present invention is to provide a conveying apparatus which prevents a document from being damaged by accidental opening and closing operations of the drawer portion, and a document reading apparatus.

The object of the present invention can be achieved by providing a medium conveying apparatus which at least includes a drawer type hopper or stacker which receives therein a medium and which is loaded in the apparatus body, so that the medium is fed from the hopper onto a feed passage and is discharged into a stacker, wherein a sensor is provided in the feed passage to detect the presence or absence of the medium in the feed passage, so that when the presence of the medium in the feed passage is detected by the sensor, the control is carried out so as not to allow opening or closing of the drawer.

The sensor is provided at least on the drawer type hopper or stacker. A medium conveying apparatus further comprises a judging means for judging whether or not the medium is located at a boundary between the drawer type hopper or stacker and the apparatus body in accordance with the detection result of the sensor.

Furthermore, a medium conveying apparatus further comprises a locking portion which is driven by a drive means to engage with an engaging portion provided on the drawer type hopper or stacker, and a controller which controls the drive means in such a way that when the judging means judges that the medium is located at the boundary of the drawer type hopper or stacker and the apparatus body, the locking portion can be engaged by the engaging portion.

A medium conveying apparatus further comprises an unlocking switch to disengage the locking portion from the engaging portion. When the absence of the medium in the feed passage is detected in accordance with the detection result of the sensor, the drive means is driven to disengage the locking portion from the engaging portion.

A medium conveying apparatus further comprises an indicator which indicates the absence or presence of the medium on the feed passage, and a controller which causes the indicator to light when the presence of the medium in the feed passage is detected by the sensor.

Furthermore, in an apparatus having a front loading mechanism which includes a tray which can be retractably inserted in an apparatus body, and a means for controlling the opening and closing operations of the tray, according to the present invention, an operator panel of the apparatus is provided on a front surface of the tray.

In the present invention, if the presence of the medium in the feed passage is detected by the sensor, the drawer type hopper or stacker cannot be opened to prevent the medium from being damaged.

In particular, a sensor is provided on the drawer type hopper, so that whether or not the drawer type hopper can be opened is judged in accordance with the detection of the discharge of the medium from the drawer type hopper.

The locking portion which is provided to lock the hopper prevents the drawer type hopper or stacker from opening when the medium is located in the feed passage.

Moreover, the indication of the presence of the medium on the feed passage prevents an operator from opening the drawer type hopper or stacker by mistake.

The operator panel provided on the front-loading type tray ensures that an operator panel can be actuated even when the tray is opened.

BRIEF DESCRIPTION OF THE DRAWINGS

These and other objects of the present invention will become apparent from the following detailed description of the preferred embodiments of the invention, taken in connection with the accompanying drawings.

In the drawings:

FIG. 1 is a front elevational sectional view of a scanner according to an embodiment of the present invention;

FIG. 2 is a block diagram of the scanner;

FIG. 3 is a table showing detection results of feed sensors and judgements of the state of a document in the scanner;

FIG. 9 is a view of an engaging portion provided on the rear of the scanner;

FIG. 10 is a top view of the locking portion and the engaging portion;

FIG. 17 is a flow chart according to another embodiment;

DETAILED DESCRIPTION OF THE INVENTION

Figure 4A:
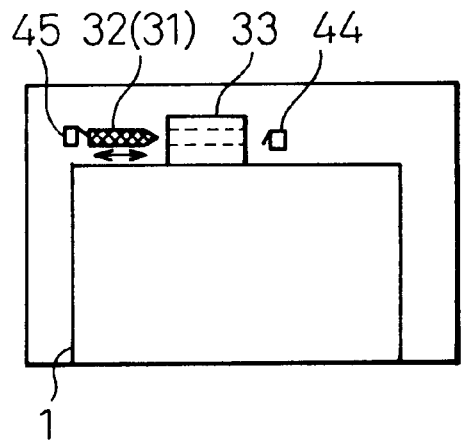
FIGS. 4A, 4B, and 4C are views showing a hopper locking mechanism in the scanner.

FIG. 1 shows a front elevational view of a reading apparatus (scanner) according to an embodiment of the present invention. In FIG. 1, numeral 1 designates the drawer type hopper tray in which documents to be read are accommodated.

Numeral 2 designates the pick-up roller (PR) which feeds the documents contained in the hopper one by one into the feed passage. Numeral 3 designates the separation roller (SR) which feeds one document fed by the pick-up roller 2 into the feed passage and prevents more than one document from being conveyed into the feed passage at one time. FR1 through FR4 designate the feed rollers 5–8 which are driven by a motor (not shown) to feed the document toward a stacker 9 in which the documents which have been read are discharged. Numeral 10 designates the feed passage in and along which the documents are conveyed.

Numeral 12 designates the close-contact type sensor which reads letters or images on the documents and generates electric signals corresponding to data thus read.

FS1 and FS2 designate the feed sensors 14 and 15, respectively. The feed sensors 14 and 15 are adapted to detect the presence or absence of the paper (documents). The feed sensor (FS1) 14 is provided in the hopper 1 not only to serve as a hopper empty sensor which detects the presence or absence of the documents in the hopper 1 but also to detect the leading and tail ends of the documents to be fed to thereby determine the commencement or completion of the reading operation of the documents in accordance with the detection results, respectively.

The feed sensor (FS2) 15 is provided in the vicinity of the boundary between the hopper and the apparatus body to detect the presence or absence of the documents on the feed passage and the tail end of the document to thereby determine the discharge of the document from the hopper.

In the scanner shown in FIG. 1, the document discharged from the hopper is fed to the lower portion of the apparatus through the U-shaped feed passage into the stacker 9. The stacker 9 in the illustrated embodiment is provided with an opening and has no drawer type tray. However, the invention can be applied to a stacker which is in the form of a drawer type tray.

FIG. 2 shows a block diagram of the scanner.

In FIG. 2, numeral 21 designates the controller which is comprised of a microprocessor. Numeral 22 designates the ROM in which the control program for the scanner is stored; 23 the RAM in which data read from the documents is temporarily stored; 24 the motor "a" which drives a locking portion 31 which will be described hereinafter; 26 the motor "b" which is used as a drive source to open or close the hopper 1, respectively. Note that the hopper can be a manual type which it is manually opened or closed. In the manual hopper, no motor "b" is provided in the apparatus. Numeral 28 represents the LED which indicates the state of the documents which will be discussed below.

Numeral 29 designates the interface portion which is connected to an external device, so that data communication can be performed between the scanner and the external device; and 30 designates the reading portion which is comprised of, for example, a close-contact type line sensor.

FIG. 3 is a table which shows the detection results of the feed sensors 14 and 15 and the corresponding judgement results of the state of the documents within the apparatus.

In FIG. 3(1), both the feed sensors 14 and 15 detect the documents, so that the presence of the document in the feed passage is determined. In this state, practically, the document is being discharged from the hopper.

In FIG. 3(2), the feed sensor 14 detects the document, but the feed sensor 15 does not detect the document. In this state, the leading end of the document to be read does not reach the position corresponding to the feed sensor 15. There is a slight gap between the discharge end of the hopper (boundary between the hopper and the apparatus body) and the position at which the feed sensor 15 is attached. Due to this gap, it is likely that the leading end of the document which is discharged from the hopper and reaches the feed passage within the apparatus body cannot be detected by the feed sensor 15. Therefore, in the case of (2) in FIG. 3, it is judged that the document is present at the feed passage and is passing through the discharge end of the hopper, similarly to (1) in FIG. 3.

In FIG. 3(3), contrary to FIG. 3(2), the feed sensor 14 does not detect the document and the feed sensor 15 detects the document. In this case, the tail end of the document has passed the position corresponding to the feed sensor 14 but it is not sure whether or not the document is completely discharged from the hopper due to the gap between the feed sensor 1 and the discharge end of the hopper. Therefore, in the case of FIG. 3(3), it is judged that the document is passing through the discharge end of the hopper.

Finally, looking at (4) in FIG. 3, none of the feed sensors 14 and 15 detect the document. In this state, the leading end of the document does not reach the position corresponding to the feed sensor 14 and the tail end of the document has passed the position corresponding to the feed sensor 15. Therefore, in the case of FIG. 3(4), it is determined that the document is not passing through the discharge end of the hopper and there is no document on the feed passage.

In the case of (4) in FIG. 3, if the hopper is opened, there are little possibility that a document is damaged, and hence, it is possible to open the hopper without causing any problems. Contrary to this, in the case of FIGS. 3(1) through (3), if the hopper is accidentally opened, the document can be damaged, and in the worst case, the document can be destroyed. Moreover, the damaged document might invite another paper jam. To prevent this, in the illustrated embodiment, if it is judged that the document is passing through the discharge end of the hopper, no hopper can be opened.

Figure 4B:
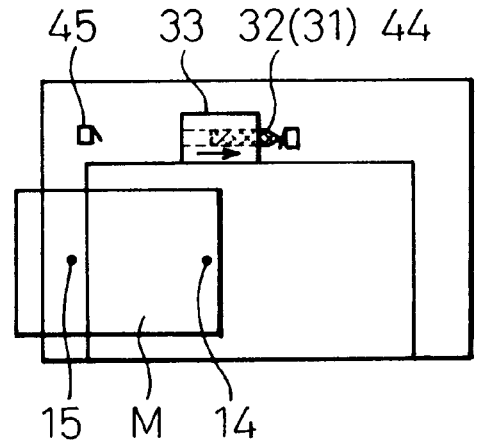
Figure 4C:
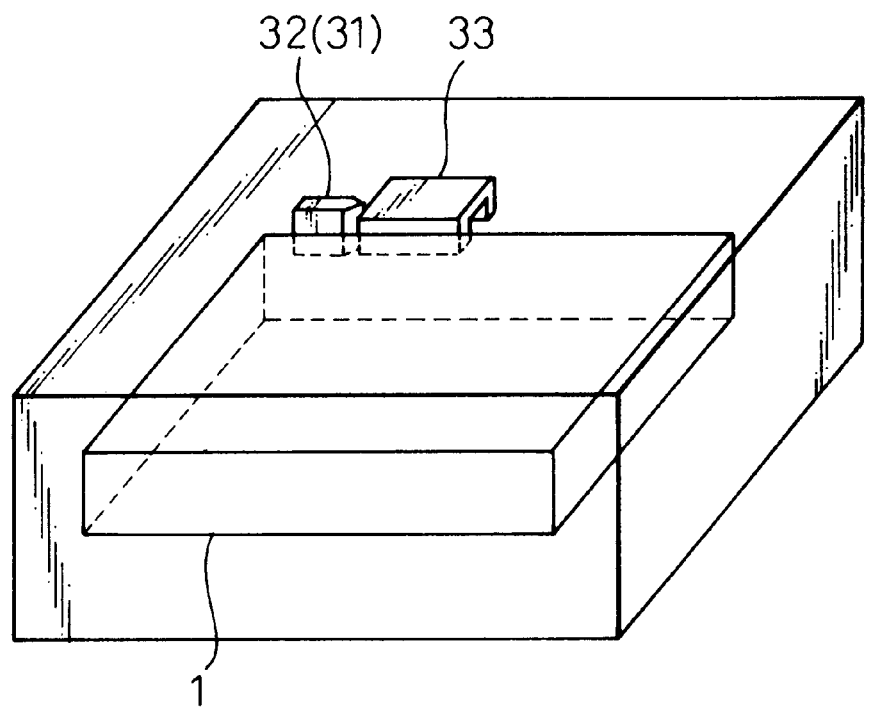

FIGS. 4A–4C show a scanner having a hopper locking mechanism according to an embodiment of the present invention. FIGS. 4A and 4B show plan views of a scanner in an unlocked position and a locked position, respectively. FIG. 4C is a perspective view of a scanner.

In the drawing, a locking panel 32 of a locking portion 31 is driven by a motor in the direction indicated by an arrow; and an engaging portion 33 is provided on the rear surface of the hopper 1, respectively. The hopper cannot be opened when the engaging portion is engaged by the locking portion. When the locking panel 32 (locking portion 31) is disengaged from the engaging portion 33, the hopper can be withdrawn. In this case, the hopper can be opened either manually or by a motor.

In the scanner according to this embodiment, the locking portion is driven in accordance with the detection results of the feed sensors 14 and 15. If the detection results of the feed sensors are judged as shown (1) through (3) in FIG. 3, the locking portion is moved by the controller to engage with the engaging portion to thereby prevent the hopper from opening. Consequently, the opening and closing operation of the hopper is substantially prohibited, and thus, if an operator accidentally tries to open the hopper, no damage to the document being fed occurs.

When the feed sensor detects the state shown in (4) of FIG. 3, the hopper may be opened. The controller drives the locking portion to disengage the locking portion from the engaging portion, so that the hopper is free to open or close.

Figure 5:
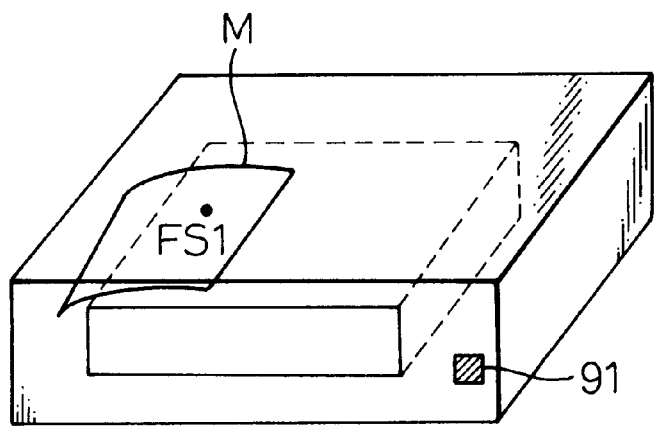
FIG. 5 is a perspective view of the scanner with an indicator.

As shown in FIG. 5, the scanner according to the illustrated embodiment is provided with a indicator 91 which indicates the presence of the document on the feed passage. The indicator is made of, for example, an LED.

Figure 6:
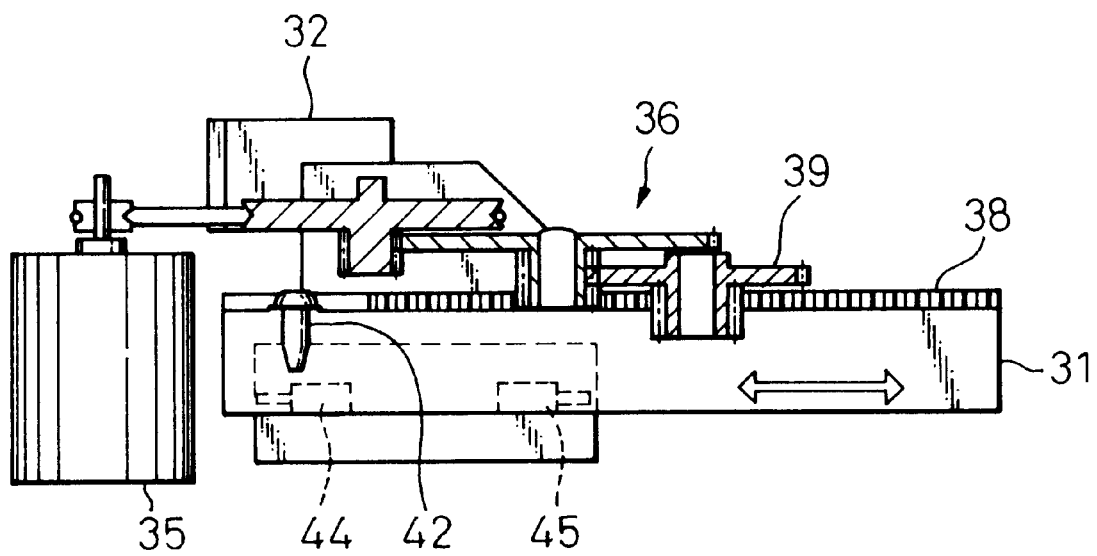
FIG. 6 is a front elevational view of a locking portion according to the invention.
Figure 7:
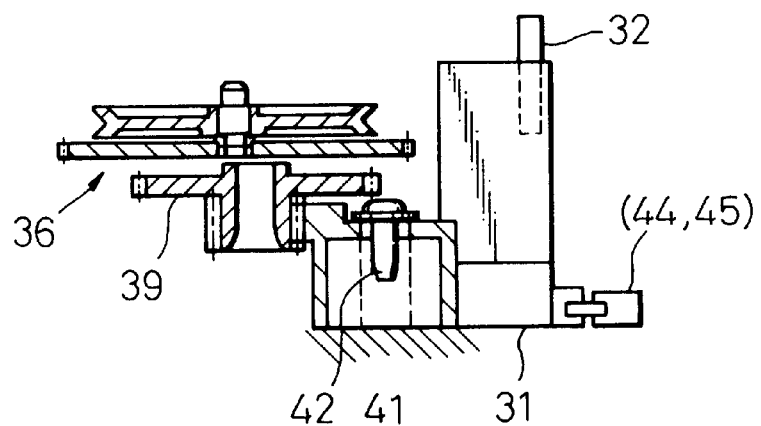
FIG. 7 is a side view of the locking portion.

In the illustrated embodiment, when the document is present in the feed passage, the locking portion is actuated to prevent the hopper from opening. Moreover, an operator can recognize the occurrence of the paper jam through the indication by the indicator, so that he or she does not try to open the hopper. FIGS. 6 and 7 are a front elevational view and a side elevational view of the locking mechanism according to an embodiment of the present invention, respectively.

The locking pawl 32 has a sharp tip which can be inserted in the engaging portion 33 provided on the rear surface of the hopper, as will be discussed below.

The locking portion 31 is moved in the left and right directions in FIG. 6 by the driving force of the motor 35 to which a gear train 36 consisting of three gears is connected through a belt. The gear train 36 reduces the number of revolutions of the motor 35 and transmits the driving force to the locking portion 31.

The locking portion 31 is provided with a rack 38 which is in mesh with the gear 39, so that the driving force of the motor 35 is transmitted to the rack 38 through the third gear 39 to move the locking portion 31 in the left and right directions in FIG. 6.

In FIGS. 6 and 7, numeral 41 designates the cam guide. The locking portion is provided with a pair of elongated holes. A cam guide pin 42 is inserted in the cam guide 41 to restrict the direction of the movement of the locking portion 31. Numerals 44 and 45 designate a lock-on detecting sensor and a lock-off detecting sensor, respectively.

Figure 8:
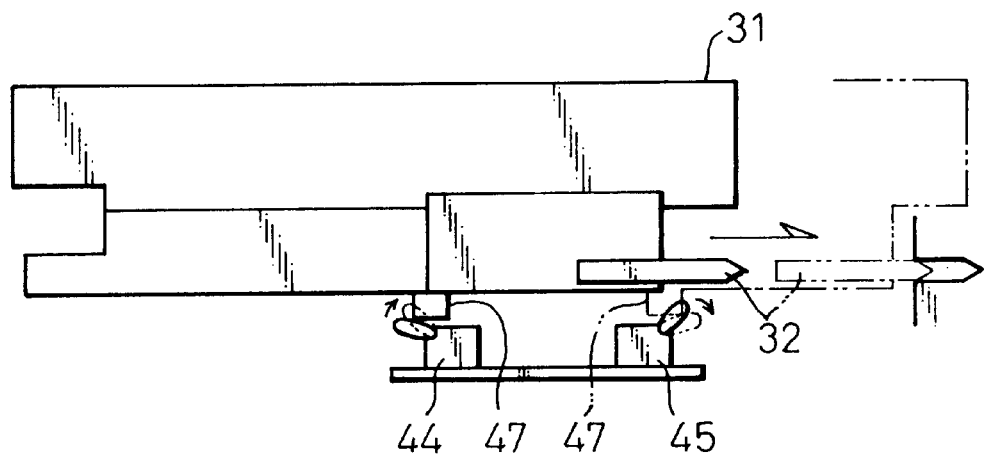
FIG. 8 is an explanatory view of the locking portion and sensors.

The lock-on detecting sensor 44 detects the engagement of the locking portion 31 with the engaging portion provided on the rear surface of the hopper. The lock-off detecting sensor 45 detects the disengagement of the locking portion 31 from the engaging portion. The lock-on detecting sensor 44 and the lock-off detecting sensor 45 are pushed by a projection 47 provided on the locking portion to detect the state of the locking portion 31. FIG. 8 shows the operation of the locking portion 31 to detect the state of the sensors. In FIG. 8, the locking portion 31 indicated by a solid line is shown in a unlocked position and that indicated by a phantom line is shown in a locked position, respectively.

In the unlocked position in which the locking portion 31 is disengaged, the projection 47 presses the lock-off detecting sensor 45, so that the unlocked position can be detected. When the locking portion 31 is engaged by the hopper, the projection 47 presses the lock-on detecting sensor 44. Consequently, it is detected that the locking portion 31 is engaged with the engaging portion of the hopper.

FIG. 9 shows a rear view of the hopper. The hopper is moved in the directions indicated by arrows in FIG. 9. The documents are set at a portion 1a of the hopper 1.

The hopper is provided on the rear surface thereof with the engaging portion 33 which can be engaged by the locking portion. The engaging portion 33 has a widened front end which facilitates the insertion of the locking pawl 32 therein.

Figure 11:
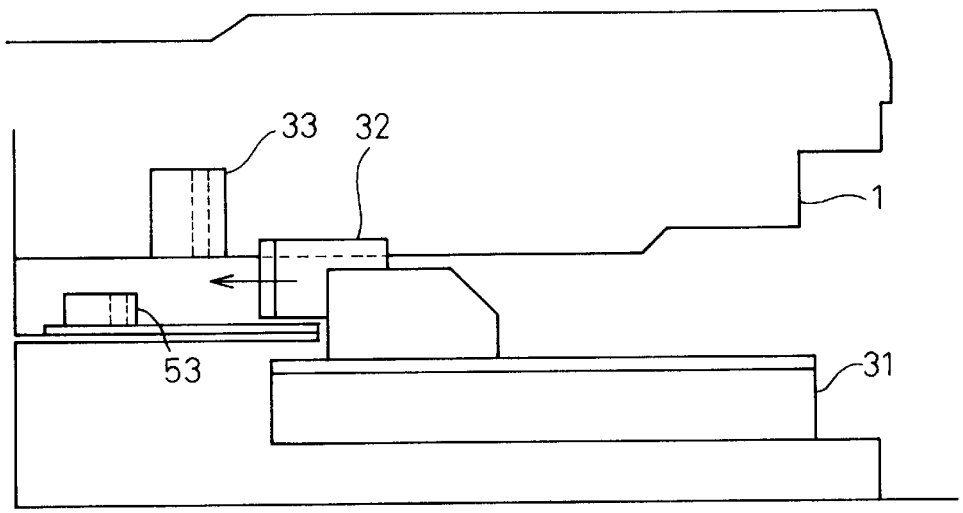
FIG. 11 is a front elevational view of the locking portion and the engaging portion.
Figure 12:
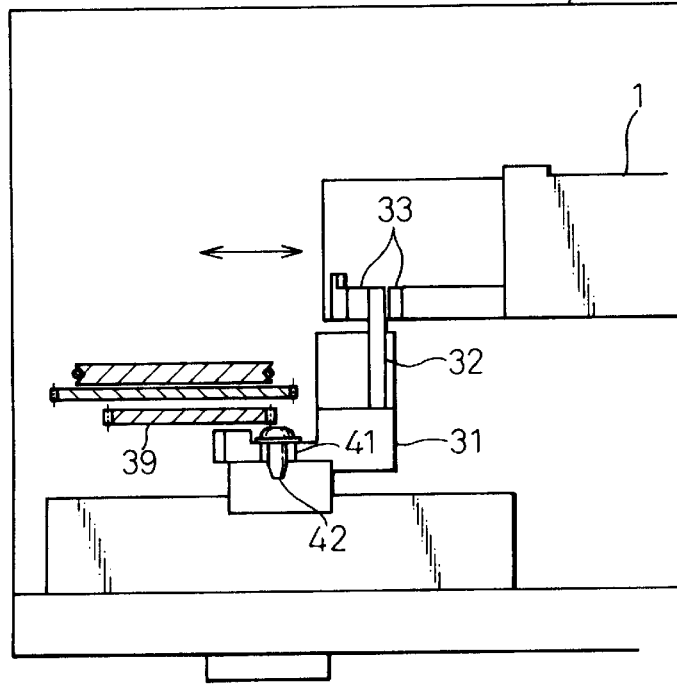
FIG. 12 is a side elevational view of the locking portion and the engaging portion.

FIGS. 10–12 show the positional relationship between the locking portion 31 and the engaging portion 33 provided on the rear surface of the hopper. FIGS. 10, 11 and 12 are a top view, a front elevational view, and a side elevational view, respectively. In these figures, numeral 49 designates the outer cover for the reader. The motor and the gears, etc., are omitted in FIG. 11.

As can be seen in FIG. 10, the gear provided on the inner side of the gear 39 of the gear train 36 is in mesh with the rack of the locking portion 31, so that when the motor is rotated, the locking portion is moved in the direction indicated by an arrow in FIGS. 10 and 11. The direction of the movement of the locking portion 31 is restricted by the guide pin 42 inserted in the cam guide 41. Namely, the locking portion 31 is moved in the direction toward the engaging portion 33 formed on the rear surface of the hopper.

As may be seen in FIGS. 11 and 12, the locking portion 31 is engaged at the upper portion thereof by the engaging portion 33 of the hopper. An engaging portion 53 shown in FIGS. 10 and 11 is provided on the frame of the scanner. If the locking portion 31 is actuated when the hopper is in an open position, the movement of the locking pawl 32 is no longer restricted by the engaging portion 33 provided on the rear surface of the hopper. To this end, the engaging portion 53 is provided on the scanner frame to restrict the movement of the locking portion 31 if the locking portion is actuated by mistake when the hopper is in an open position. The locking pawl engages with the engaging portion 53 at the lower side of the locking pawl 32.

The engagement of the locking portion with the engaging portion provided on the rear surface of the hopper does not permit an operator to open the hopper. Accordingly, if the document is present at the boundary between the hopper and the apparatus body, there is no fear that the document can be accidentally damaged by opening the hopper.

Figure 13:
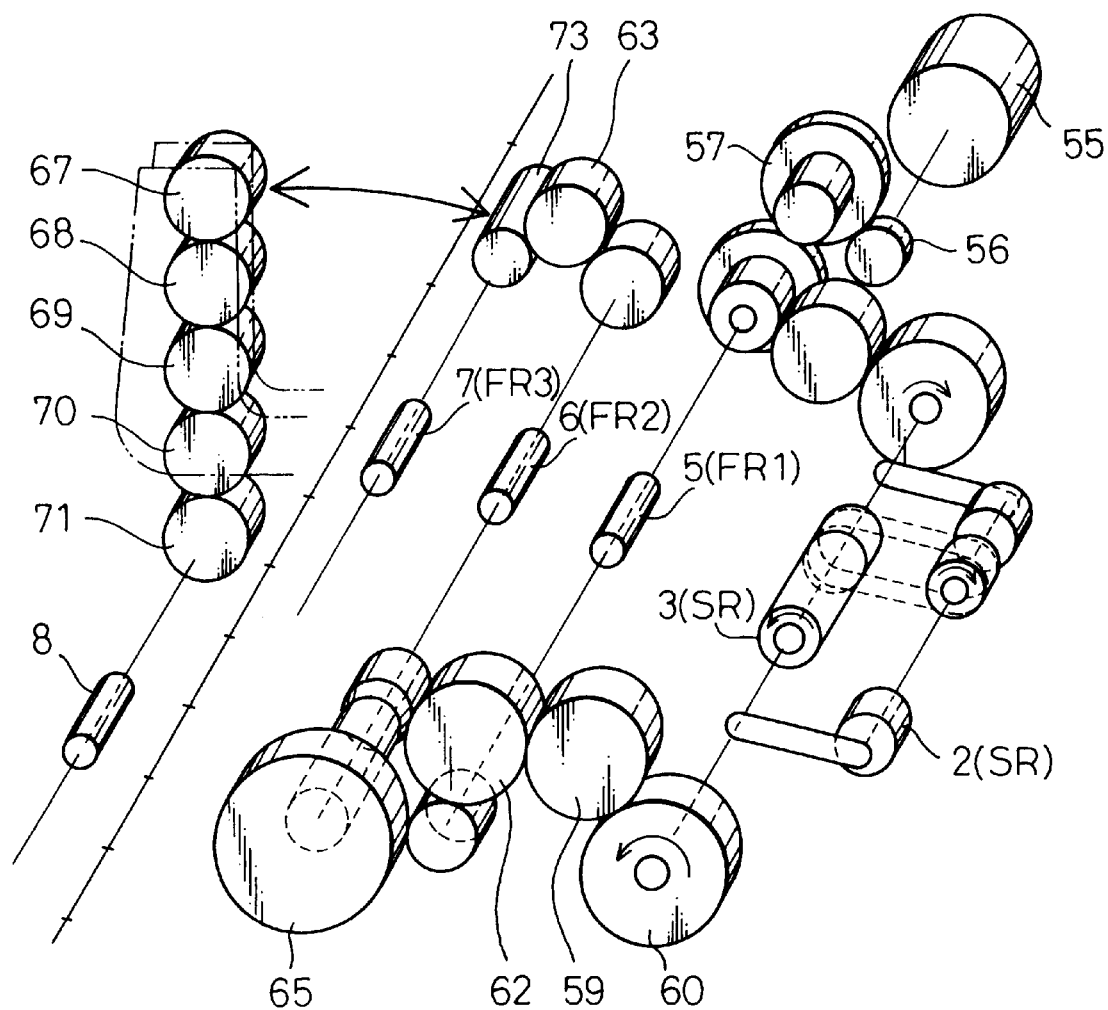
FIG. 13 is a perspective view showing a connection of rollers.

FIG. 13 shows a connection of the feed rollers 5 (FR1) through 8 (FR4). In FIG. 13, a motor 55 secured to the hopper 1 is a drive source for the feed rollers. The motor 55 is connected to the feed roller 5 (FR1) through gears 56 and 57, so that the rotation of the motor can be transmitted to the feed roller 5 (FR1). The FR1 is connected to a separating roller 3 (SR) and a pick-up roller 2 (PR) through gears 59 and 60. The FR1 is connected to the FR2 through a gear 62. The shaft of the FR2 is provided with a knob 65 which will be discussed hereinafter. The FR2 and FR3 are connected through a gear 63, so that all the feed rollers, etc., provided on the hopper can be actuated in association with each other.

A power transmitting means for transmitting the drive force of the motor to the feed roller 8 (FR4) will be discussed below. In the scanner according to an embodiment of the present invention, the conveyance of the documents can be carried out even when the hopper is drawn from the apparatus body by the driving mechanism within the hopper. In this case, the feed roller 8 (FR4) is separated from the rollers within the hopper in accordance with need, since it is not necessary to apply the drive force to the feed roller 8 (FR4).

There are gears 67 through 70 within the apparatus body, of which the gear 70 is connected to a gear 71 provided on the shaft of the FR4. To apply the drive force of the motor to the FR4, the gear 67 is in mesh with a gear 73 provided on the shaft of the FR3.

Figure 14A:
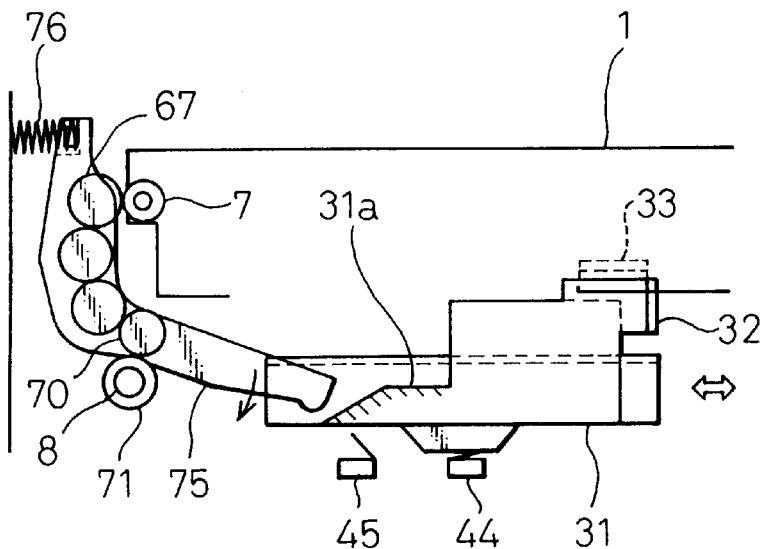
FIGS. 14A and 14B are views showing a switching mechanism of the FR 4.
Figure 14B:
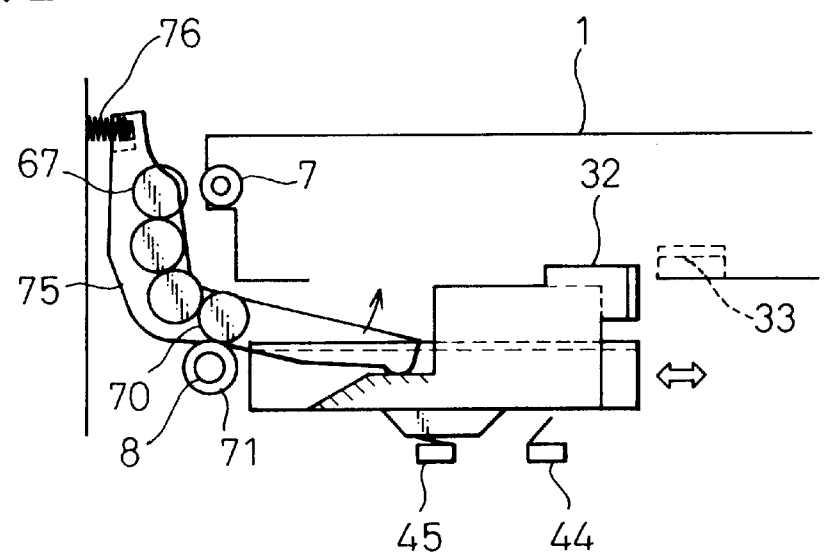

FIGS. 14A and 14B show an embodiment of a power transmission switching mechanism to transmit the power to the FR4. The FR4 is connected in FIG. 14A and is disconnected in FIG. 14B, respectively.

The locking portion 31 is obliquely cut away at the rear end thereof (left end). The gears 67 through 71 are attached to the power transmitting arm 75 which is rotatable about a pivot axis. The power transmitting arm 75 is provided at one end thereof with a spring 76 which biases the power transmitting arm 75 to push the same. The other end of the power transmitting arm 75 is formed such that it comes into contact with a cam surface 31a defined by the cut away portion of the locking portion 31.

As may be seen in FIG. 14A, when the locking portion engages with the engaging portion, the locking portion 33 is advanced (moved in the right hand direction) and the front end of the power transmitting arm does not contact with the cam surface so that the power transmitting arm is displaced in the direction of an arrow by the biasing force of the spring 76. Consequently, the FR3 (gear 73) engages with the gear 67, so that the drive force of the motor is transmitted to the FR4. In this state, the lock-on sensor 44 is activated and the lock-off sensor 45 is inactivated.

Figure 15:
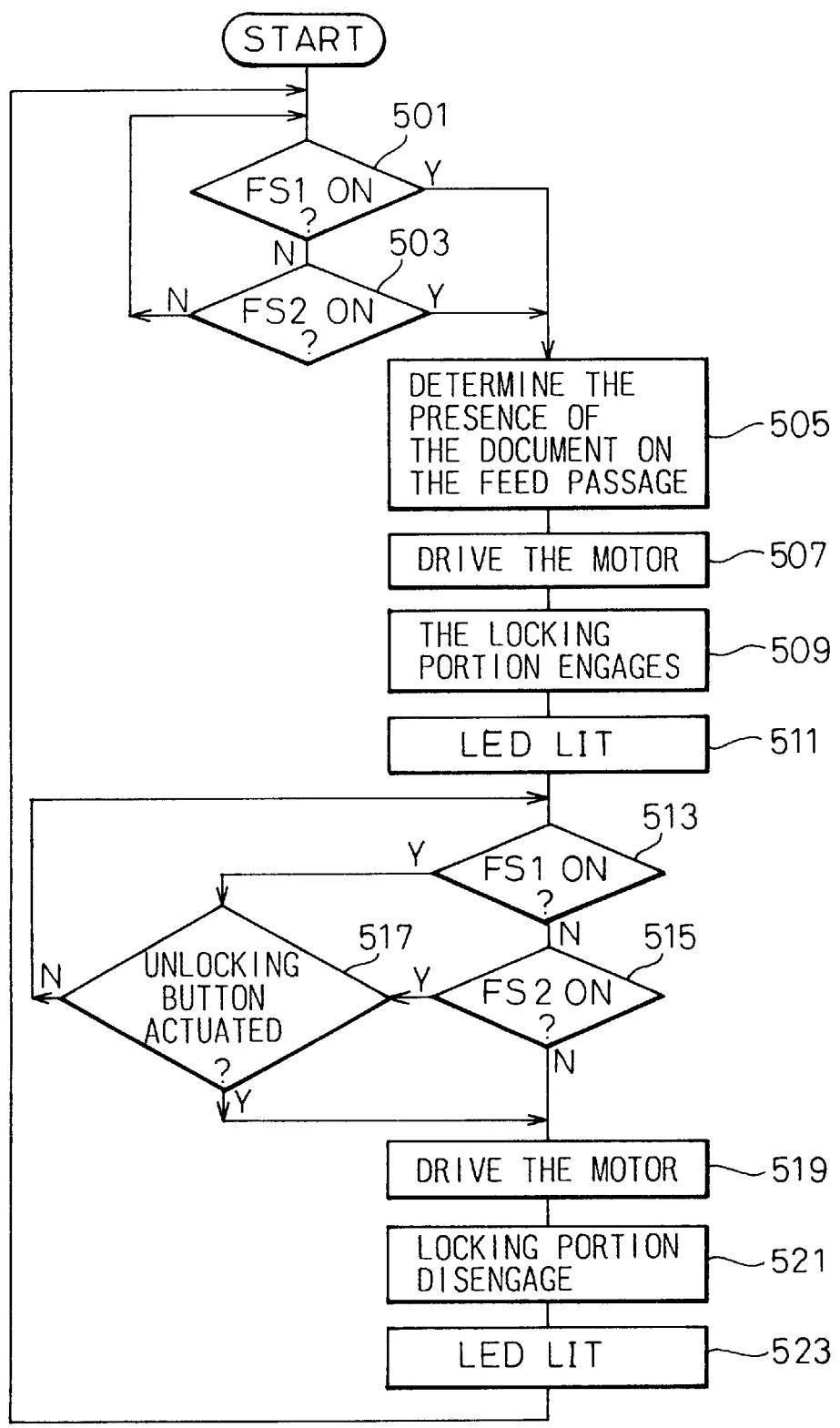
FIG. 15 is a flow chart of document detecting operations according to the embodiment.

When the locking portion is disengaged from the engaging portion as shown in FIG. 14B, the locking portion 31 is retracted (moved in the left direction), and hence, the power transmitting arm is moved up by the cam surface of the locking portion 31 in the direction of an arrow against the biasing force of the spring. In this case, the connection between the FR3 (gear 73) and the gear 67 is broken, so no power is transmitted to the FR4. Consequently, the FR4 does not rotate. In this state, the lock-off sensor 45 is activated and the lock-on sensor 44 is inactivated. FIG. 15 shows a flow chart of the operations to detect the documents, which will be discussed below.

When the apparatus operates, the controller judges whether or not the feed sensor 14 (FS1) is turned ON, i.e., the document is detected by the FS1 (step 501). If no document is detected by FS1 at step 501, whether or not the FS2 detects the document is checked at step 503. If the document is not detected by the FS1 or FS2, it is judged that there is no document in the feed passage, so that the control is returned to steps 501 and 503 to carry out the detection of the document.

If the FS1 detects the document at step 501, or the FS2 detects the document at step 503, the controller determines the presence of the document on the feed passage. In this case, there is a possibility that the document is present at the boundary between the hopper and the apparatus body, and hence, if the hopper is accidentally opened, there is a high probability that the document may be damaged. To prevent this, the controller commences the operations to prevent the operator from opening the hopper.

Firstly, the controller drives the motor (step 507) to drive the locking portion. Consequently, the locking portion engages with the engaging portion of the hopper (step 509), and thus, the hopper cannot be opened. Thereafter, LED is lit at step 511, so that the operator can recognize that a paper jam has occurred and, accordingly, that the hopper should not be opened.

After that, the controller checks whether or not the document is detected by the FS1 at step 513. If the FS1 detects no document, the control proceeds to step 515 at which whether or not the FS2 detects the document is checked. If neither the FS1 or FS2 detect the document at steps 513 and 515, the controller determines that the paper jam is eliminated and that no document is on the feed passage. In this case, even if the hopper is opened, there is no problem. Therefore, the controller drives the motor (step 519) to disengage the locking portion from the engaging portion (step 521). At the same time, the controller extinguishes the LED which is used to indicate the presence of the document in the feed passage.

Figure 16A:
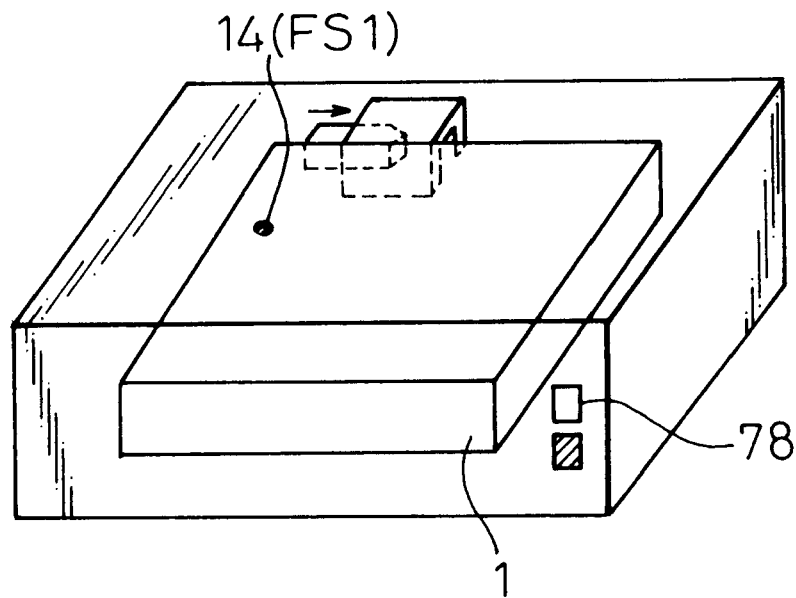
FIGS. 16A and 16B are views showing an unlocking button in the scanner.
Figure 16B:
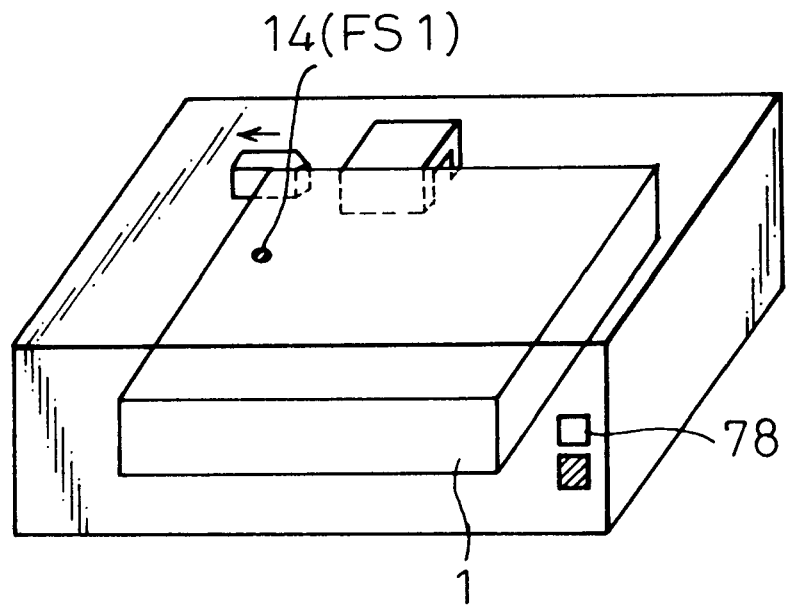

If the FS1 detects the document at step 513 or the FS2 detects the document at step 515, whether or not an unlocking button 78 is actuated is checked at step 517. In the reader of the illustrated embodiment, the unlocking button 78 is provided on the front surface of the apparatus body as shown in FIGS. 16A and 16B. If the unlocking button is actuated, the controller commences the unlocking operation regardless of the detection results of the feed sensors. Namely, when the unlocking button is actuated, the controller drives the motor at step 519 to move the locking portion to thereby disengage the latter from the engaging portion of the hopper at step 521. As a result, the hopper can be opened. Also, the controller extinguishes the LED at step 523. A modification may be made in which even if the unlocking button is actuated, as long as at least one document exists within the hopper, the controller does not commence the unlocking operation, and therefore the hopper cannot be opened.

FIG. 17 shows a flow chart of the operations according to another embodiment.

In FIG. 17, the locking operation is completed in the initial position. If the reading operation begins at step 701, whether or not the paper, i.e., the document to be read is present is checked at step 703. If no paper is detected at step 703, the lock is released at step 707, so that the hopper can be opened.

If the presence of the paper is detected at step 703, the control proceeds to step 709 to detect the occurrence of the jam by the feed sensor. If no occurrence of the jam is detected at step 709, the control is returned to step 701 to read the subsequent document.

If there is a jam at step 709, the occurrence of the jam is indicated at step 711. Thereafter, whether or not the jammed paper is removed by the operator, i.e., whether or not the feed sensor detects the paper is checked at step 713. If there is no paper at step 713, the lock is released at step 715. If no paper is removed at step 713, whether or not the unlocking button is depressed for 3 or more seconds is checked at step 717 to judge whether or not the user wants to compulsively unlock the lock. If the unlocking button is depressed for 3 or more seconds, the lock is released at step 719.

The above discussion has been directed to the control to prevent the hopper from being opened using the locking mechanism. However, the invention can be applied, for example, to an apparatus in which the hopper is opened or closed by the motor. In this application, if the feed sensor detects the document on the feed passage, the operation of the motor is made substantially ineffective so as not to open the hopper.

The countermeasure to the paper jam in the feed passage will be discussed below.

Figure 18A:
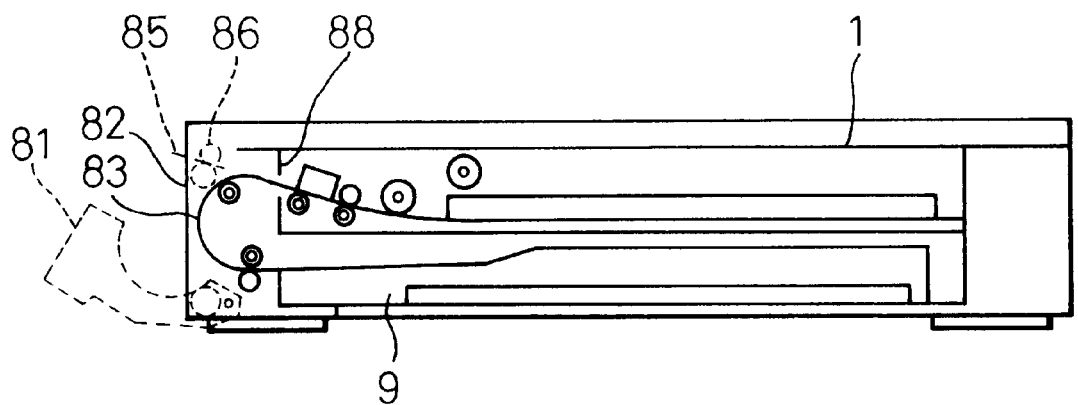
FIGS. 18A and 18B are views showing a cover of the scanner.
Figure 18B:
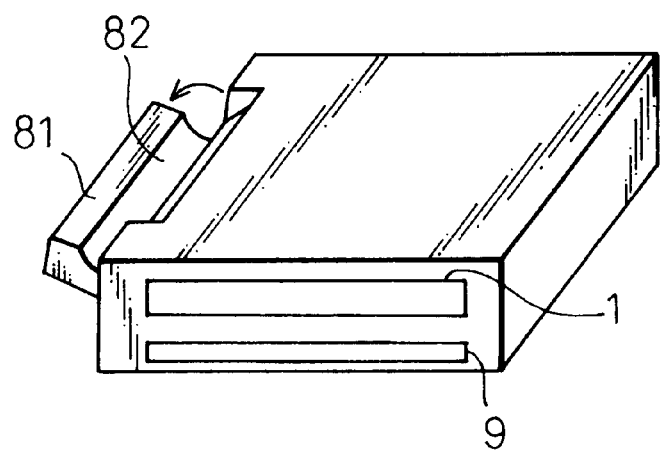

There is an opening and closing cover 81 provided on the side surface of the apparatus, as shown in FIGS. 18A and 18B. FIGS. 18A and 18B are a front elevational view and a perspective view of a scanner. When the cover 81 is opened, an opening 82 appears on the side surface of the scanner.

When the cover is closed, the documents are conveyed to the stacker through the feed passage 83. When the cover is opened, the document discharging port 85 appears in the opening 82. In the discharging port 85 are provided discharge rollers 86 through which the documents are discharged from the discharge port when the cover is opened. The jammed paper can be removed through the opening.

When the jam occurs, the operator opens the cover on the side surface of the apparatus. When the cover is opened, the operator can visually confirm the state of the document in the feed passage.

If the document is present at the boundary 88 between the hopper 1 and the apparatus body, it is necessary to remove the jammed document without opening the hopper. If the document is directly accessible by an operator through the opening, the jammed document can be removed by the operator who draws out the document by his or her fingers. Conversely, if the document is not accessible at the front end thereof, no one can directly remove the document.

Figure 19A:
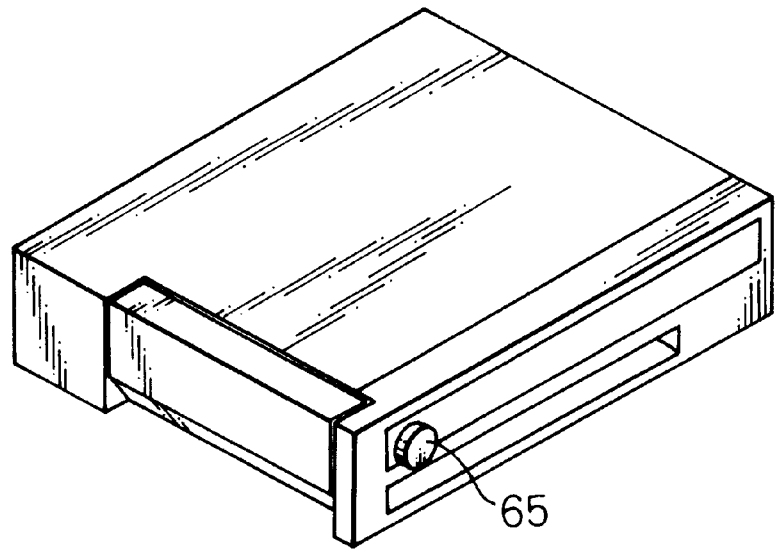
FIGS. 19A and 19B are external views of the scanner having a knob.
Figure 19B:
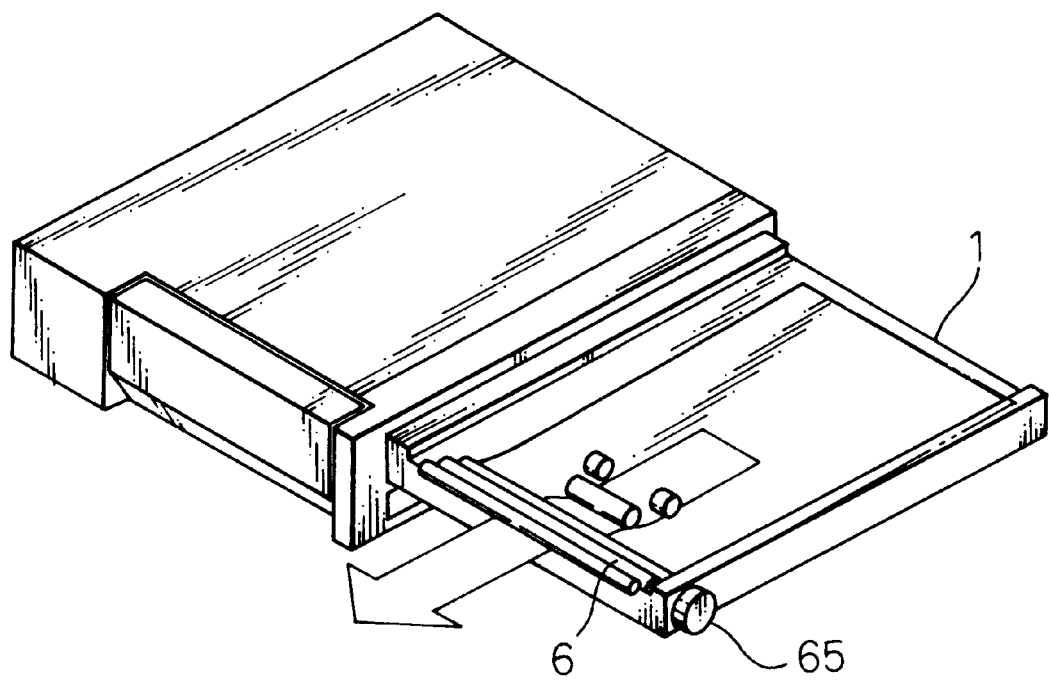

FIGS. 19A and 19B show an outer appearance of the scanner, of which FIG. 19A shows a hopper in a closed position and FIG. 19B shows a hopper in an open position, respectively. As can be seen in the Figures, a knob 65 is provided on the front surface of the hopper of the scanner. As shown in FIG. 19B, the feed rollers FR are provided in the hopper to feed the medium (documents) received in the hopper in the direction indicated by an arrow. The knob is attached to one of the shafts of the feed rollers (FR1–3) within the hopper, so that when the knob is rotated, the feed rollers are rotated. Thus, the documents can be manually fed.

Figure 20:
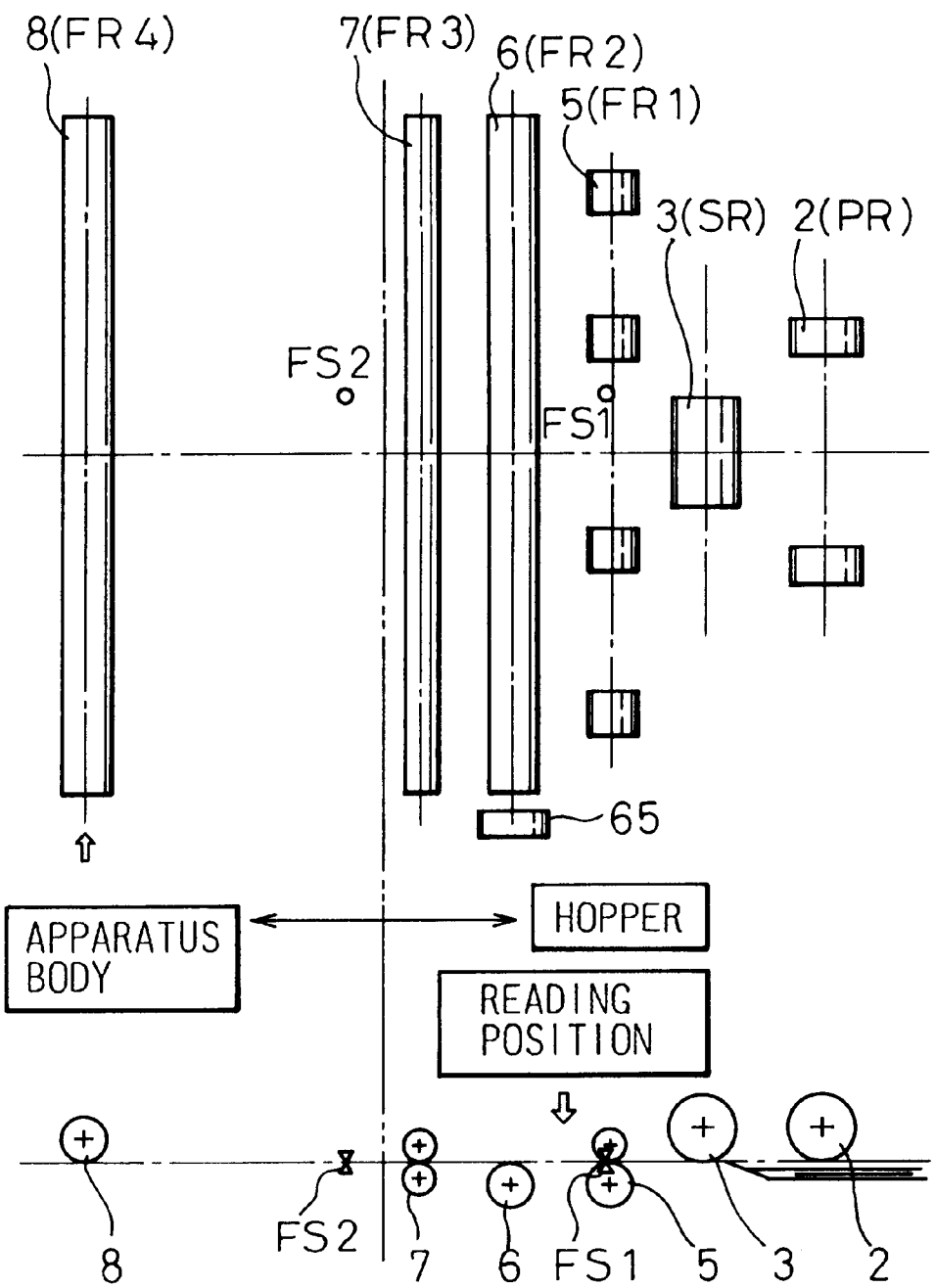
FIG. 20 is a view showing a positional relationship between the feed rollers and the knob.

FIG. 20 shows a positional relationship between the feed rollers and the knob. In FIG. 20, the three feed rollers 5 (FR1) through 7 (FR3) are attached in the hopper. Since the FR1 through FR3 are connected by gears (not shown), the rollers are rotated in association with each other. Thus, when the knob which is attached to one of the shafts of the feed rollers 5 (FR1) through 7 (FR3) is rotated, the rollers 5 (FR1) through 7 (FR3) can be rotated in association. In FIG. 20, the knob is attached to the shaft of the FR2. The FR2 is opposed to the reading portion (line sensor) to serve as a platen. The FR4 is a feed roller provided on the apparatus body. The feed roller 8 (FR4) rotates in association with the FR1 through FR3.

If a part of the document is located within the hopper, when the knob is rotated in the direction to move the document in the left direction in FIG. 20, the jammed document is gradually moved toward the opening. When the document is moved until a part of the document is exposed from the opening, the document can be grasped by the operator's hand.

When the document is drawn by the hand, there is a possibility that the document is broken or the feeding system is subject to an excess load. To prevent this, it is desirable that the document is manually drawn while feeding the same by the feed rollers using the knob even after a part of the document is exposed from the opening to such extent that it can be drawn by the hand.

The knob is provided on the hopper in the illustrated embodiment. This arrangement makes it possible to feed the documents if the hopper is opened. Alternatively, it is possible to provide the knob on the apparatus body.

When the document is removed from the feed passage, neither the FS1 nor the FS2 detect the document, and accordingly, the controller brings the hopper in an openable position in accordance with the detection results. If it is necessary to re-read the jammed document, the hopper is opened and then the document is put in the hopper. Thereafter, the hopper is closed to read the document.

If it is confirmed that the leading end of the document does not reach the boundary of the hopper and the apparatus body, when the opening portion is exposed, a simple solution is to open the hopper to thereby remove the jammed document. In this case, the operator merely actuates the unlocking button. If the unlocking button is actuated, the hopper can be opened regardless of the detection results of the feed sensors, as mentioned above. When the hopper is opened, the jammed document can be easily removed.

Note that in the illustrated embodiment, there is only one indicator (91: see FIG. 5) to indicate the presence of the document on the feed passage. It is possible to provide two or more indicators. For example, in the case that there are two indicators, one is for indicating the presence of the document in the feed passage and one is for indicating the absence of the document in the feed passage.

Although both the locking of the hopper and the indication thereof to inform the operator of the locking are effected in the illustrated embodiment, it is possible to perform only the locking of the hopper or the warning indication. In case where only the warning indication is carried out, the operator may open the hopper, but the operator can at least recognize the presence of a document in the feed passage. Consequently, the operator can judge whether the hopper may be or may not be opened in accordance with the indication.

Figures 21, 22:
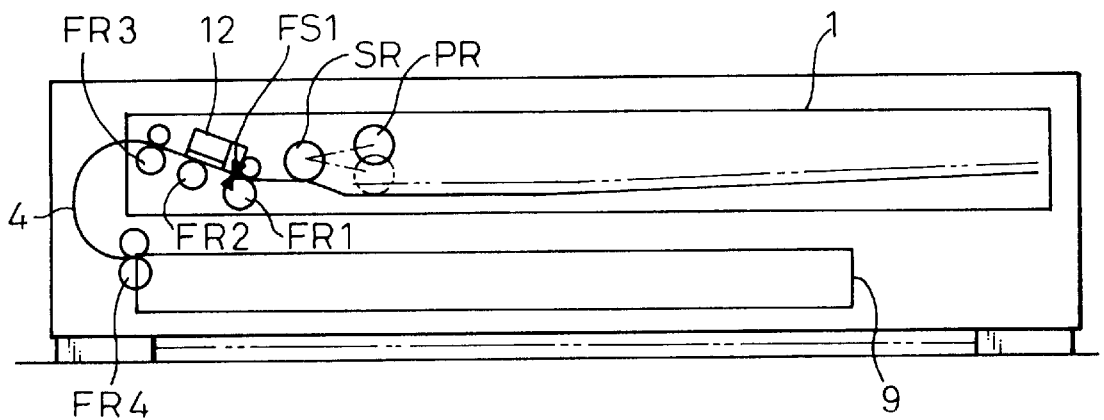
FIG. 21 is a front elevational sectional view of a modification of the scanner according to the embodiment.
FIG. 22 is a table showing detection results of a document in the modified scanner.

FIG. 21 shows a front elevational sectional view of a scanner according to a modification of the first embodiment. In FIG. 21, there is only one feed sensor (FS1) in the hopper, and no feed sensor 15 (FS2) is provided. The reader shown in FIG. 21 is comprised of fewer components, thanks to the reduction in the number of the feed sensors.

FIG. 22 is a diagram which shows the detection result of the feed sensor and the position of the document in the apparatus. In FIG. 22, (1) shows a position in which the document is detected by the feed sensor. In this position, since the document to be fed exists at least in the hopper, it is judged that the document is passing through the discharge end of the hopper.

(2) of FIG. 12 shows a position in which no document is detected by the feed sensor. In this position, essentially, it can be judged that the document has been discharged from the hopper. However, upon judgement, the gap between the feed sensor and the discharge end of the hopper, as shown in FIG. 21 must be taken into account. To this end, it is determined that the document has been discharged from the hopper when a time in which the tail end of the document, past the feed sensor, passes through the discharge end of the hopper, has lapsed.

With respect to the control of the locking of the hopper, the engagement of the locking portion with the engaging portion is held in (1) of FIG. 12, whereas, in (2) of FIG. 12, the locking portion is driven to be disengaged from the engaging portion, so that the hopper is free to open.

Figure 23:
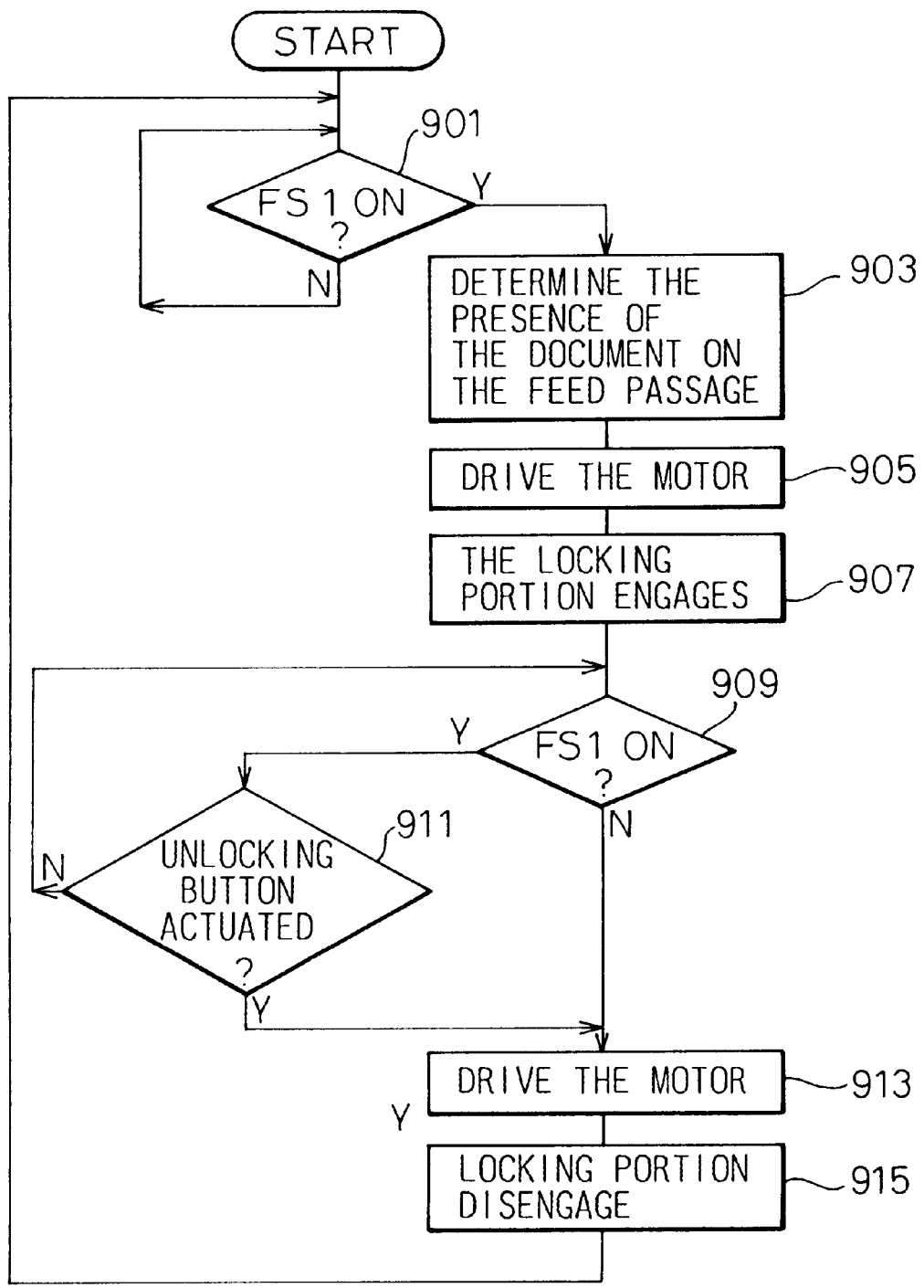
FIG. 23 is a flow chart of document feeding and lock control operation in the modified scanner.

FIG. 23 is a flow chart of the locking operations in connection with the detection result of the feed sensor.

When the apparatus operates, whether or not the FS1 detects the document is checked at step 901. If no document is detected, the judgement at step 901 is repeated.

If the FS1 detects the document at step 901, the controller determines that the document exists in the feed passage at step 903. Thereafter, the controller drives the motor at step 905, so that the locking portion is engaged by the engaging portion of the hopper to prevent the hopper from opening at step 907.

In this state, the controller commences the operation to determine whether or not the jam is eliminated. At step 909, whether or not the document is detected by the FS1 is checked. For instance, if the jammed document is removed, the FS1 is turned OFF, and accordingly, the controller drives the motor at step 913 to unlock the locking portion (step 915).

If the FS1 detects the document at step 909, the controller checks whether the unlocking button is actuated at step 911. If the unlocking button is actuated at step 911, the controller drives the motor to execute the unlocking operation at step 913.

If the unlocking button is not actuated at step 911, the control is returned to step 909 to monitor the detection of the document by the FS1.

As can be understood from the foregoing, the single feed sensor which detects the feed state of the document ensures that the locking portion of the hopper is driven in accordance with the detection result of the feed sensor to prevent the hopper from opening in accordance with need.

In the illustrated embodiment, a knob is provided on the hopper, so that the feed roller can be rotated by actuating the knob to manually move the documents on the feed passage in order to, for example, discharge the jammed document. Consequently, the following problems could be caused.

Namely, if the rotation of the knob takes place during the normal feed of the document, the operator may accidentally touch the rotating knob, which is dangerous. Moreover, touching the rotating knob exerts an excess load on the rotating knob or feed rollers, etc., thus resulting in an adverse influence on the feed of the documents or the precision of the feeding system. Therefore, it is necessary to disconnect the knob from the feeding system, such as the rollers, etc., when feeding the documents.

Figure 24:
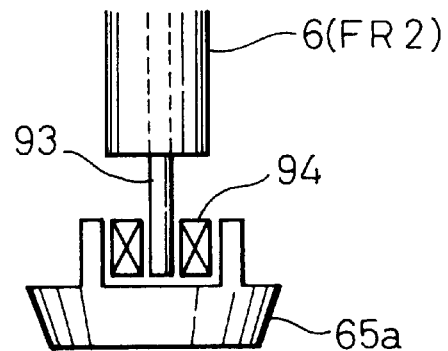
FIG. 24 is a view showing one embodiment of a knob having a one-way clutch.

FIG. 24 shows an embodiment to solve the problems mentioned above. In this embodiment, the knob 65*a* is connected to the roller shaft 93 by a one-way clutch 94. When the knob is actuated to rotate the roller 6 (FR2) in the direction to advance the document, the rotation of the knob is transmitted to the roller which thus rotates. Conversely, if the roller 6 (FR2) is rotated by the motor (not shown), the rotation of the roller is not transmitted to the knob through the one-way clutch 94, so that the knob does not rotate while the roller rotates. Even if the operator touches the knob, the knob idles with the help of the one-way clutch. Thus, the operator who accidentally touches the knob is free from danger and no excess load is exerted on the roller, etc.

Figure 25:
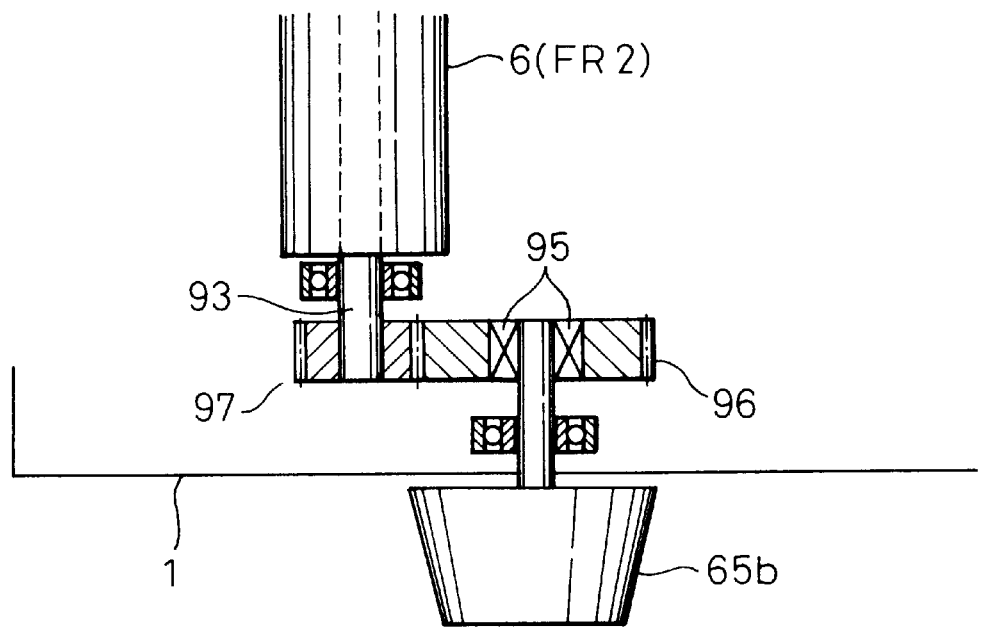
FIG. 25 is a view showing another embodiment of a knob.

FIG. 25 shows another embodiment. In FIG. 25, the one-way clutch 95 is attached to the front end of the shaft of the knob 65*b*. A gear is attached to the one-way clutch. Another gear 97 is attached to the shaft 93 of the feed roller 6 (FR2), so that the gear 96 of the knob 65*b* is in mesh with the gear 97 of the roller 6. With this arrangement, the same effect as that of FIG. 24 can be obtained.

The hopper (tray) which is in an open position will be discussed below.

Figure 26A:
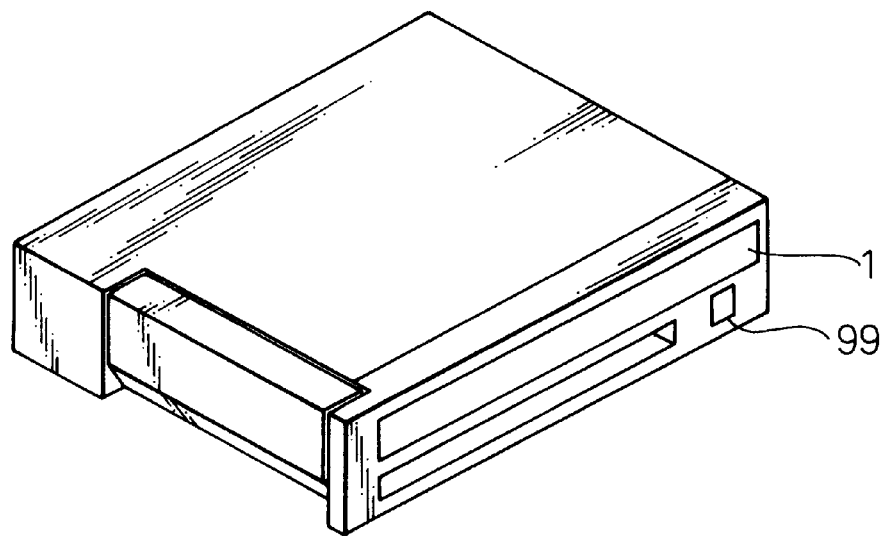
FIGS. 26A and 26B are views showing problems caused by an operator panel provided on a front surface of an apparatus body.
Figure 26B:
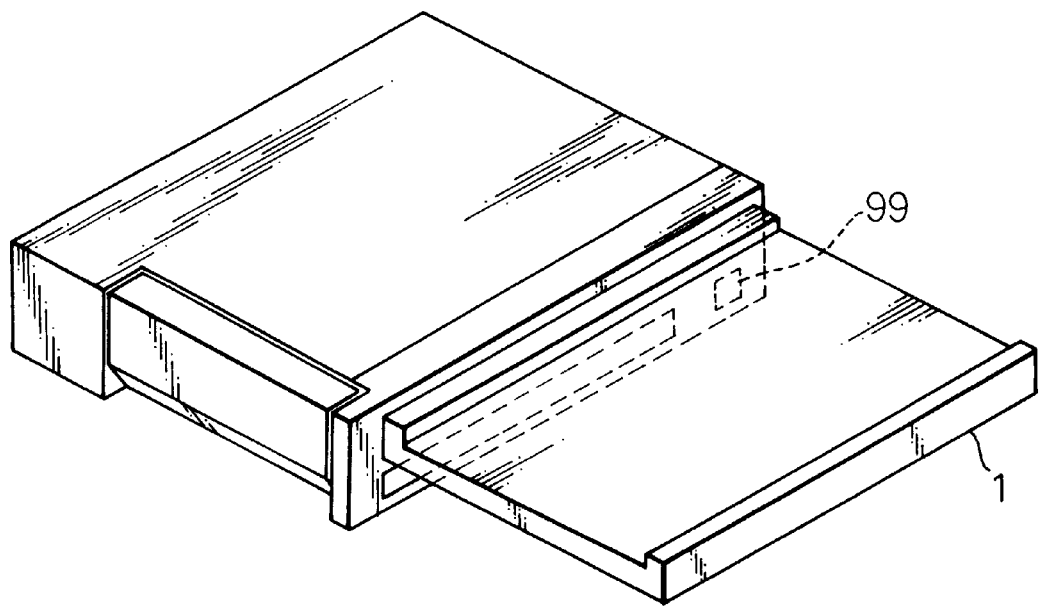

In a front-loading type scanner as shown in FIGS. 26A and 26B, an operator panel having an operation button which is actuated to open and close the tray and an indicator which indicates various kinds of information, etc., is provided. The hopper is closed in FIG. 26A and is opened in FIG. 26B, respectively. If the operator panel is attached to the apparatus body, the following problems are produced.

Namely, when the tray is opened as shown in FIG. 26B, the operator panel is hidden by the tray, so that it is difficult for the operator to actuate the button or view the indication of the indicator. In particular, in recent miniaturized scanners, the size of the apparatus tends to be determined in accordance with the size of the hopper tray 1. Therefore, the operator panel is usually provided directly below the tray and hence, it is difficult to actuate the button and confirm the indication when the tray 1 is opened.

Figure 27A:
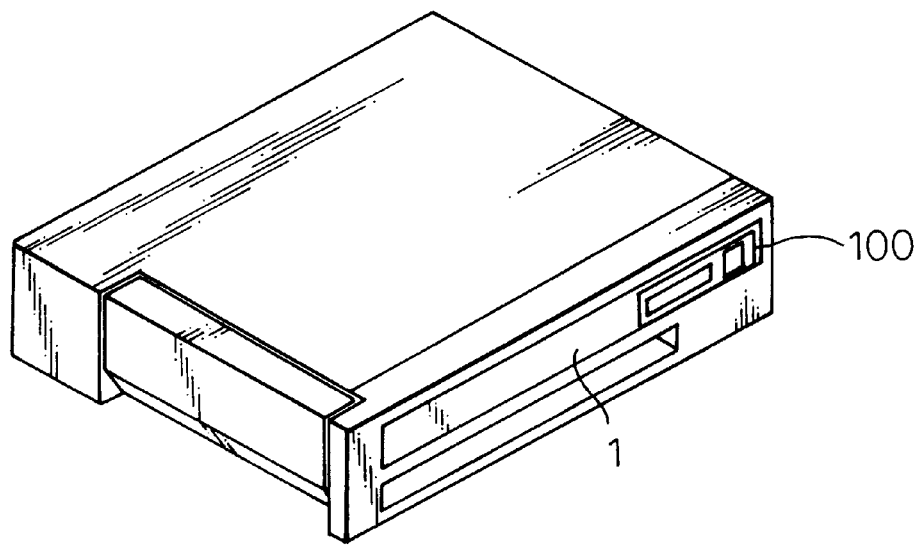
FIGS. 27A and 27B are views showing a scanner having an operator panel provided on a drawer type hopper.
Figure 27B:
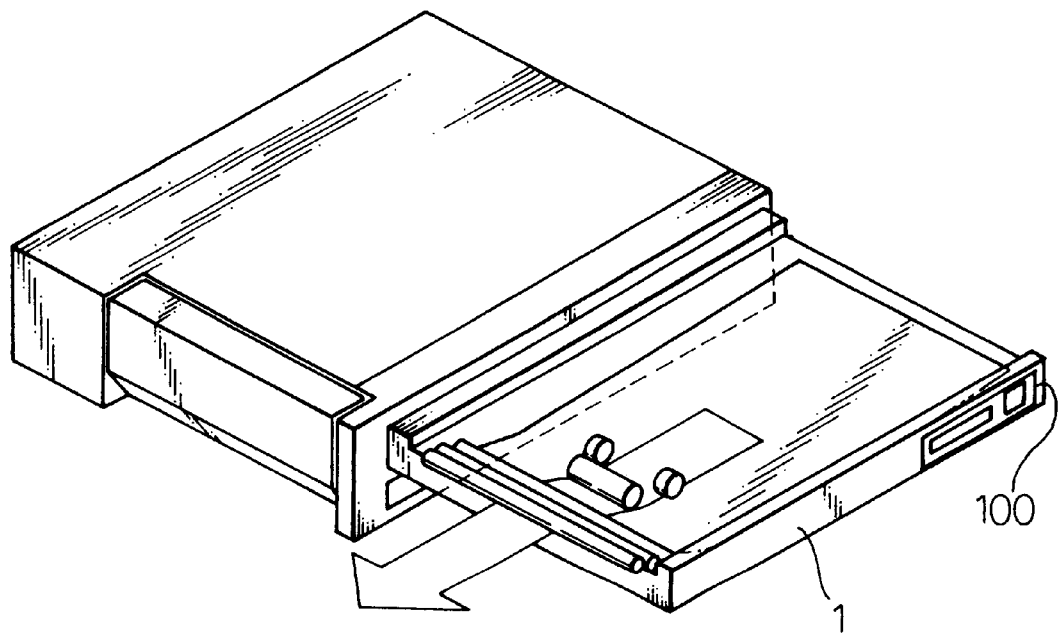

FIGS. 27A and 27B show an embodiment of a scanner having an operator panel 100 according to the present invention. The hopper 1 is closed in FIG. 27A and opened in FIG. 27B. In this embodiment, the operator panel 100 is attached to the hopper 1, so that when the hopper is opened, a button of the panel 100 can be actuated and the indication can be easily viewed.

When the hopper is opened, the operator panel is not hidden and is always visible, thus resulting in an enhancement of the operability and visibility.

Figure 28A:
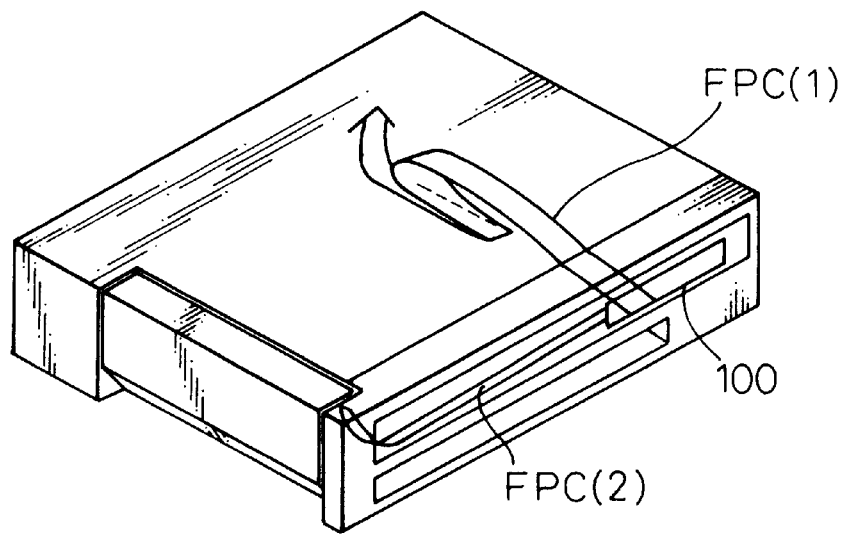
FIGS. 28A and 28B are views showing a connection of the operator panel.
Figure 28B:
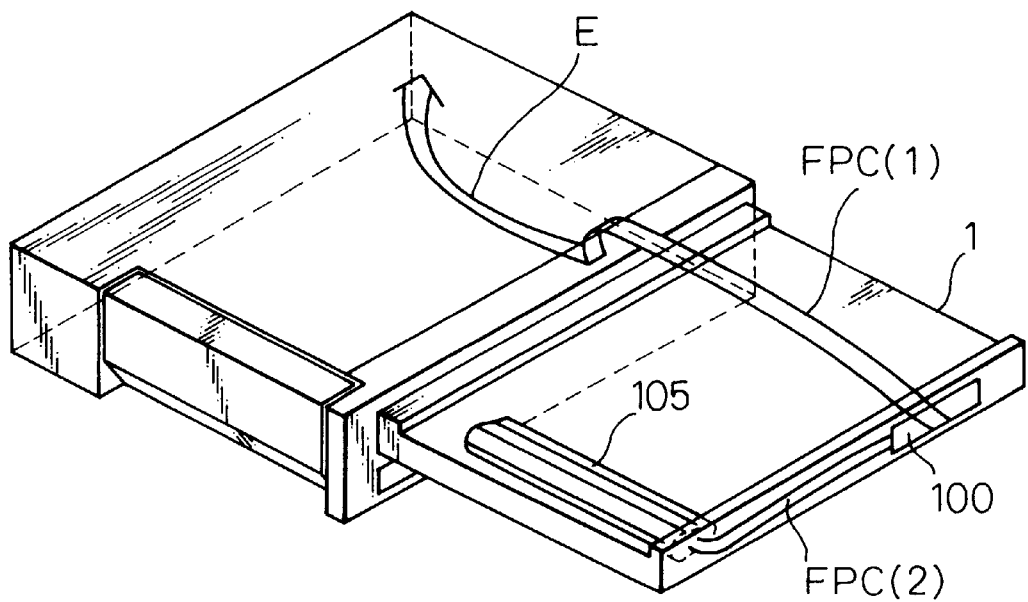
Figure 29:
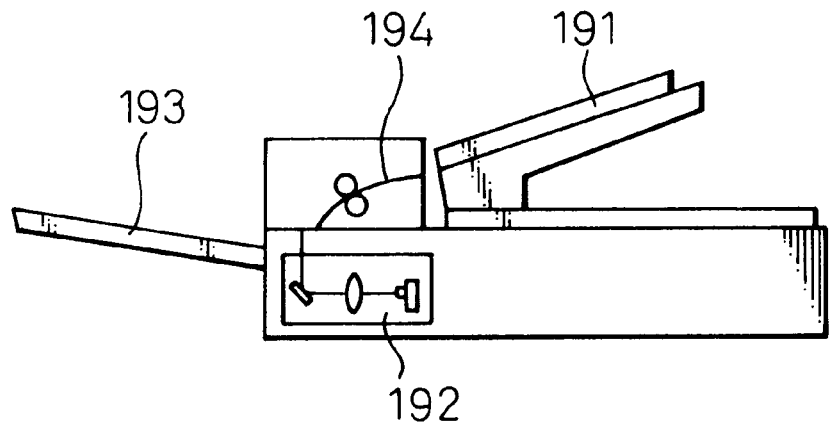
FIG. 29 is a view of a prior art scanner.
Figure 30:
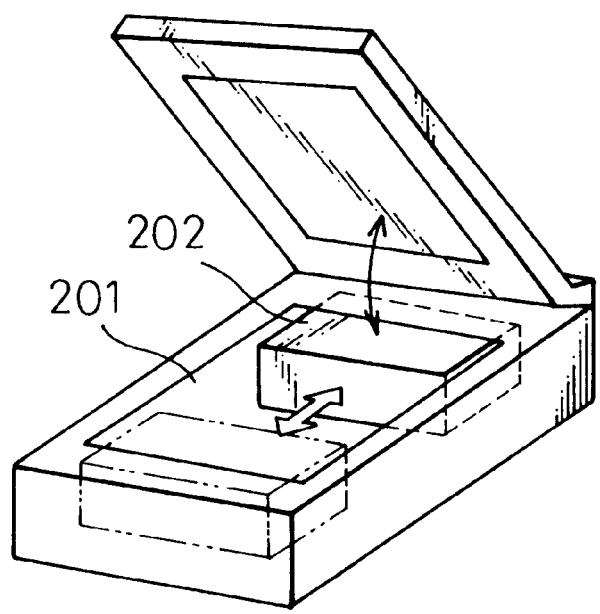
FIG. 30 is a perspective view of another prior art scanner.
Figure 31A:
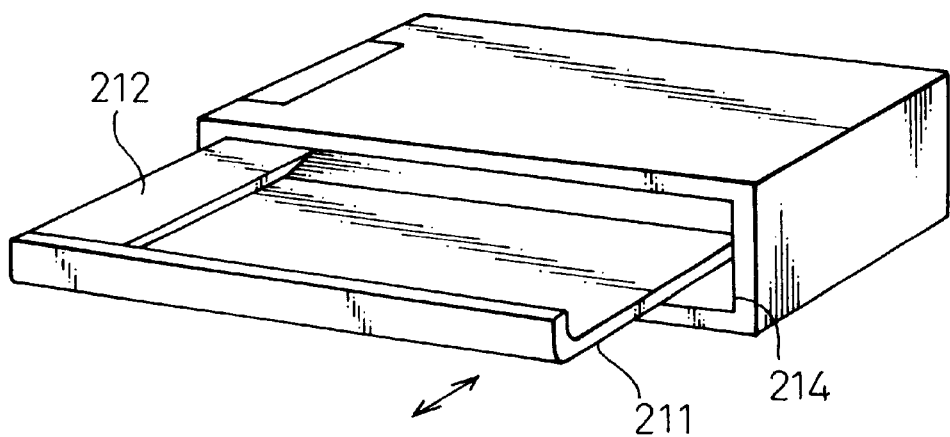
FIGS. 31A and 31B are views showing a scanner on which the present invention is based.
Figure 31B:
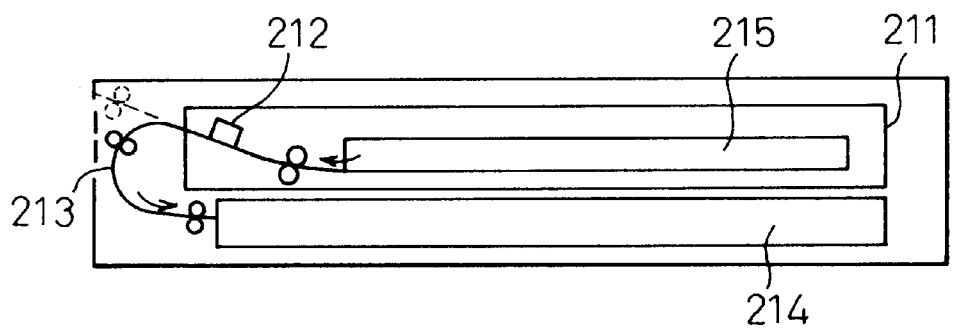
Figure 32A:
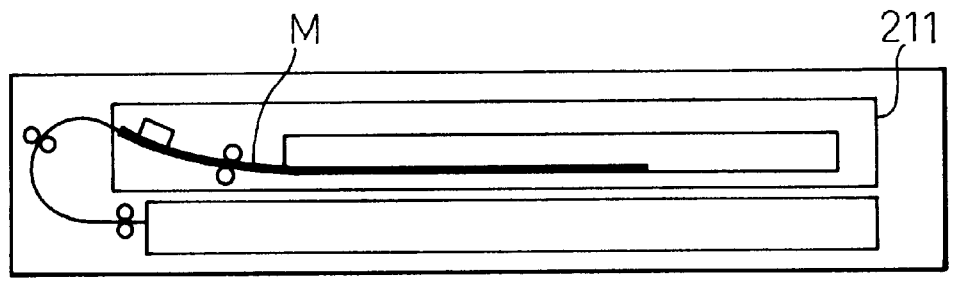
FIGS. 32A, 32B, and 32C are views showing the scanner of FIGS. 31A and 31B when a document is jammed.
Figure 32B:
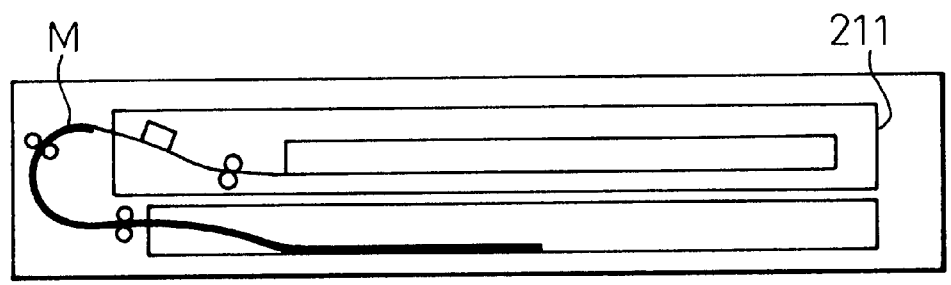
Figure 32C:
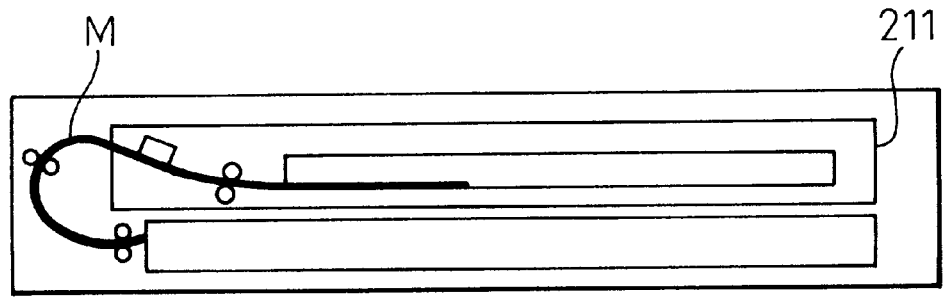

FIGS. 28A and 28B show the operator panel and the apparatus body to which the operator panel is to be connected. The hopper is closed in FIG. 28A and is opened in FIG. 28B, respectively. The operator panel is attached to the tray and a main board (not shown) is provided in the apparatus body. The main board is provided thereon with a microprocessor (not shown) by which the operation of the scanner is controlled.

The operator panel and the main board are connected by a flexible cable FPC(1). The length of the flexible cable FPC(1) is determined in accordance with the overall length of the apparatus when the tray is opened, so that when the tray is drawn, the connection of the operator panel and the main board is ensured. The flexible cable is bent at the intermediate portion thereof, and the portion on the main board side ("E" in FIG. 28B) is secured to the inside of the apparatus. Thus, no engagement of the cable with the tray occurs during the opening or closing of the tray, and hence, the cable is prevented from being damaged. The image sensor (not shown) in the reading head 105 is connected to the main board through a flexible cable FRC(2) and through the operator panel 100.

Note that the element to be attached to the tray is not limited to the operator panel as in the embodiment, and it is possible to attach only the operation button for opening and closing the tray, or only the indicator to the tray. Other elements can be attached to the tray.

As can be understood from the above discussion, according to the present invention, no paper jam occurs or the hopper is prevented from being accidentally opened during feeding of the medium. Consequently, no damage to the medium takes place and there is no adverse influence on the feed operation.

In particular, since the problem resides in the opening operation of the hopper when the medium exists in the hopper, at least a sensor is provided in the hopper to detect the presence or absence of the medium, so that when the medium is present at the boundary of the hopper and the apparatus body, it is not possible to open the hopper.

Furthermore, the locking mechanism provided to lock the hopper is actuated when the presence of the medium on the feed passage is detected, and hence, the hopper can be certainly prevented from being accidentally opened. Since the unlocking means is provided so as to unlock the lock even when the presence of the medium on feed passage is detected by the sensor, the hopper can be opened in accordance with need.

It goes without saying that the present invention can apply to a medium conveying apparatus including a drawer type stacker, wherein opening or closing of the stacker may not be allowed when the medium is present on the passage.

It is to be understood that the invention is by no means limited to the specific embodiments illustrated and described herein, and that various modifications thereof may be made which come within the scope of the present invention as defined in the appended claims.

What is claimed is:

1. A medium conveying apparatus comprising:

a hopper;

a stacker;

wherein any one of said hopper, said stacker and both said hopper and said stacker are of a drawer type having a drawer, wherein any one of said hopper and stacker receives a medium therein, and wherein any one of said hopper and stacker is loaded in an apparatus body of said apparatus, and a feed passage extending between said hopper and said stacker so that said medium is fed from said hopper into said feed passage and is discharged into said stacker; and a sensor means operative to detect any one of a presence and an absence of said medium in said feed passage at a boundary between any one of said hopper and said stacker and said apparatus body, so that when said presence of said medium in said feed passage is detected by said sensor means, a means for controlling controls opening and closing of said drawer of any one of said hopper, said stacker and both said hopper and said stacker, wherein said sensor means includes one sensor in any one of said hopper and stacker which is of said drawer type and another sensor in the feed passage adjacent to said hopper or stacker containing said sensor.

2. The medium conveying apparatus according to claim 1, further comprising a judging means receiving signals from each of said sensors for judging whether said medium is located at a boundary between said apparatus body and any one of said hopper and said stacker in accordance with a result detected by said sensors.

3. The medium conveying apparatus according to claim 2, further comprising:

a locking portion which is driven by a drive means to engage with an engaging portion provided on any one of said hopper and stacker; and a controlling means operative to control said drive means in such a way that when said medium is located at said boundary of said apparatus body and any one of said hopper and stackers, as determined by said judging means, said locking portion will be engaged by said engaging portion.

4. The medium conveying apparatus according to claim 3, further comprising an unlocking switch means for disengaging said locking portion from said engaging portion, so that when said unlocking switch means is actuated, said controlling means drives said drive means to disengage said locking portion from said engaging portion.

5. The medium conveying apparatus according to claim 4, wherein when said absence of said medium in said feed passage is judged in accordance with said result detected by said sensors, said controlling means drives said drive means to disengage said locking portion from said engaging portion.

6. A medium conveying apparatus comprising:

a hopper;

a stacker;

a front loading mechanism which includes a tray which can be retractably inserted in an apparatus body of said apparatus, said apparatus body including both said hopper and said stacker therein and any one of said hopper and said stacker including said tray; and a means for controlling opening and closing operations of said tray, wherein said controlling means includes an operator panel of said apparatus which is provided on a front surface of said tray and said operator panel has at least one operation button which can generate electric signals for said opening and closing operations of said tray.

7. A medium conveying apparatus comprising:

a hopper;

a stacker, wherein any one of said hopper, said stacker and both said hopper and stacker are of a drawer type having a drawer, wherein any one of said hopper and said stacker receives a medium therein, wherein any one of said hopper and said stacker is loaded in an apparatus body of said apparatus, so that said medium is fed from said hopper into a feed passage and is discharged into said stacker, such that opening and closing of any one of said hopper and said stacker is not allowed when said medium is present on said feed passage;

a locking portion movably secured to said apparatus body and an engaging portion provided on any one of said hopper and said stacker, wherein said locking portion may engage with an engaging portion to allow closing of any one of said hopper and said stacker and may disengage said engaging portion to allow opening of any one of said hopper and said stacker;

a feed roller supported by said apparatus body;

a drive means provided in said drawer of any one of said hopper and said stacker for said feed roller as a drive source; and a power transmission switching means for both transmitting a drive force to said feed roller when said locking portion engages with said engaging portion and not transmitting said drive force to said feed roller when said locking portion disengages said engaging portion.

8. A medium conveying apparatus comprising:

a hopper;

a stacker, wherein any one of said hopper and said stacker is of a drawer type having a drawer, wherein any one of said hopper and said stacker receives therein a medium, wherein any one of said hopper and said stacker is loaded in an apparatus body of said apparatus, so that said medium is fed from said hopper onto a feed passage and is discharged into said stacker, such that opening or closing of any one of said hopper and said stacker is not allowed when said medium is present on said feed passage;

a feed roller supported by said drawer; and a knob means for rotating said feed roller, wherein said knob means is connected to a shaft of said feed roller; and a one-way clutch by which said knob means is connected to said feed roller.

9. The medium conveying apparatus according to claim 8, wherein said one-way clutch is attached to a front end of said shaft of said knob means, a first gear is attached to said one-way clutch, and a second gear is attached to said shaft of said feed roller, such that said first and second gears mesh with each other.

* * * * *

UNITED STATES PATENT AND TRADEMARK OFFICE
CERTIFICATE OF CORRECTION

PATENT NO.    : 6,089,560
DATED         : July 18, 2000
INVENTOR(S)   : Fujiwara It is certified that error appears in the above-identified patent and that said Letters Patent is hereby corrected as shown below:

Title page,
[*] delete "490" and insert -- 143 --.

Signed and Sealed this

Sixteenth Day of October, 2001

Attest:

*Nicholas P. Godici*

NICHOLAS P. GODICI
*Attesting Officer*    *Acting Director of the United States Patent and Trademark Office*